United States Patent
Hinman et al.

(10) Patent No.: US 11,964,771 B2
(45) Date of Patent: Apr. 23, 2024

(54) ROTORCRAFT AUTOROTATION CONTROL THROUGH ELECTRICAL BRAKING

(71) Applicant: SiFly Aviation, Inc., Carmel Valley, CA (US)

(72) Inventors: Brian L. Hinman, Carmel Valley, CA (US); Jeffrey G. Bernstein, Middleton, MA (US); Muhammad Mubeen Javaid, Punjab (PK)

(73) Assignee: SiFly Aviation, Inc., Santa Clara, CA (US)

(*) Notice: Subject to any disclaimer, the term of this patent is extended or adjusted under 35 U.S.C. 154(b) by 0 days.

(21) Appl. No.: 18/306,108

(22) Filed: Apr. 24, 2023

(65) Prior Publication Data
US 2023/0312120 A1    Oct. 5, 2023

Related U.S. Application Data

(63) Continuation-in-part of application No. 17/015,558, filed on Sep. 9, 2020, now Pat. No. 11,634,235.

(60) Provisional application No. 62/897,688, filed on Sep. 9, 2019, provisional application No. 63/359,944, filed on Jul. 11, 2022.

(51) Int. Cl.
| | | |
|---|---|---|
| *B64D 27/24* | (2006.01) | |
| *B64C 27/00* | (2006.01) | |
| *B64C 27/57* | (2006.01) | |
| *B64C 27/58* | (2006.01) | |
| *B64C 27/68* | (2006.01) | |
| *B64D 31/00* | (2006.01) | |
| *B64D 31/06* | (2006.01) | |
| *G05D 1/00* | (2006.01) | |
| *G05D 1/04* | (2006.01) | |

(52) U.S. Cl.
CPC ............ *B64D 31/00* (2013.01); *B64C 27/006* (2013.01); *B64C 27/57* (2013.01); *B64C 27/58* (2013.01); *B64C 27/68* (2013.01); *B64D 27/24* (2013.01); *B64D 31/06* (2013.01); *G05D 1/042* (2013.01); *G05D 1/0858* (2013.01); *B60L 2200/10* (2013.01)

(58) Field of Classification Search
CPC ........ B64D 27/24; B64D 31/06; B64C 27/57; B64C 27/58
See application file for complete search history.

(56) References Cited

U.S. PATENT DOCUMENTS

| | | | |
|---|---|---|---|
| 11,634,235 B1 * | 4/2023 | Hinman | B64C 7/00 244/17.13 |
| 2014/0097290 A1 | 4/2014 | Leng | |
| 2018/0257761 A1 | 9/2018 | Oldroyd et al. | |
| 2018/0297711 A1 | 10/2018 | Oldroyd et al. | |
| 2018/0346136 A1 | 12/2018 | Arkus et al. | |
| 2019/0023388 A1 * | 1/2019 | Roberts | B64C 27/57 |

(Continued)

*Primary Examiner* — Timothy D Collins
*Assistant Examiner* — Justin Michael Heston
(74) *Attorney, Agent, or Firm* — Sunstein LLP

(57) ABSTRACT

A method of operating an electrically powered rotorcraft of the type having a fuselage and a set of N rotors driven by a set of electric motors and coupled to the fuselage, N≥4, under a failure condition preventing ordinary operation of the rotorcraft. The method includes entering a failsafe mode of operation wherein autorotation of at least four of the rotors is enabled. The method also includes using electrical braking associated with a selected group of the rotors to control pitch, roll and yaw of the rotorcraft.

27 Claims, 13 Drawing Sheets

(56) References Cited

U.S. PATENT DOCUMENTS

| | | |
|---|---|---|
| 2019/0031361 A1 | 1/2019 | McCullough et al. |
| 2019/0084684 A1 | 3/2019 | Eller |
| 2019/0263515 A1* | 8/2019 | Karem ................. B64C 39/024 |
| 2022/0011782 A1* | 1/2022 | Mikic ................. B64C 29/0033 |
| 2022/0267016 A1* | 8/2022 | Lanzendoerfer ....... B64D 27/24 |

* cited by examiner

ROTORCRAFT AUTOROTATION CONTROL THROUGH ELECTRICAL BRAKING

PRIORITY

This application is a continuation in part of U.S. application Ser. No. 17/015,558, "Electrically Powered Rotorcraft Capable of Autorotative Landing," filed Sep. 9, 2020, which claims the benefit of U.S. Provisional Application No. 62/897,688, filed Sep. 9, 2019; this application also claims the benefit of U.S. Provisional Application No. 63/359,944, "Rotor System for Electrically Powered Rotorcraft," filed Jul. 11, 2022. Each of these related applications is incorporated herein by reference in its entirety.

TECHNICAL FIELD

The present invention relates to rotorcraft, and particularly to rotorcraft having at least four rotors.

BACKGROUND ART

Vertical-take-off-and-landing (VTOL) aircraft serve a variety of needs, ranging from unmanned drone applications, to manned applications for transportation. One form of VTOL that has become pervasive for unmanned drone applications is the electric quad-copter. These are widely available for applications ranging from toys to photography, surveillance, infrastructure inspection, and agriculture.

More recently, new categories of VTOLs are now in development for applications such as freight delivery and air-taxi services for urban air transportation. Some of these are autonomously or remotely piloted, while most intended for human transportation are designed to have a pilot on-board. Many of these recent VTOL designs are electrically powered, with propulsion driven by electric motors and powered by energy sources such as batteries, hydrogen fuel cells, or hybrid generators. The use of electric propulsion technology has allowed VTOL designs to move from traditional single-rotor or dual-rotor helicopters to a wide variety of designs, many with four or more rotors.

Whether using four or more rotors, many recent VTOL designs have borrowed approaches used in unmanned electric quad-copters. One specific aspect is the move away from using rotor blade pitch to control the lift and other motion of the aircraft, as is done in traditional helicopters, to instead using independent control of the rotation speed of each rotor for this purpose, as is done in unmanned electric quad-copters. Because these VTOL designs use rotation speed for control, as in electric quad-copters, they typically use fixed rotors that do not allow pitch variation.

For all aircraft intended for carrying people, safety of the aircraft is paramount. The same is true of aircraft that can significantly affect the safety of those on the ground, such as large drones or those transporting heavy objects. One important use case in ensuring aircraft safety is safely landing an aircraft after a significant malfunction such as loss of power or engine failure.

For existing aircraft types, many mechanisms have been developed to accommodate such failures. Most airplanes can glide many miles and land safely if a suitable location can be found; multi-engine airplanes can continue to fly with failure of one engine; and most helicopters can perform autorotation, which allows them to descend relatively slowly and maneuver to land at a suitable location.

For helicopters, the ability to descend and land safely using autorotation requires the helicopter's rotor system and controls be designed to support autorotation, and requires the pilot being trained to perform autorotative landing. Autorotative landing is a specialized procedure quite distinct from ordinary flight, which generally requires significant practice to master.

Autorotation in a helicopter occurs when the engine powering the rotors is disengaged from the rotors, allowing them to rotate freely. The engine may be automatically disengaged if the engine loses power or may be manually disengaged. If the rotors are spinning when the engine is disengaged (for example, due to engine failure in mid-flight), the angular momentum of the rotors ensures they will initially continue to spin. If not carefully accounted for, drag from the rotor blades' motion through the air will quickly drain the rotational energy of the rotors, resulting in a rapid decrease of altitude. However, if the rotor blade pitch is quickly decreased, the existing motion of the blades due to rotation, and potentially also due to forward motion of the aircraft, can result in rotational forces that can maintain or even increase rotation rate, simultaneously resulting in sufficient lift to significantly slow the aircraft's rate of descent. Careful adjustment by the pilot of the rotor controls as the elevation decreases, including both collective and cyclic pitch adjustment, allows the pilot to maneuver the helicopter to a safe landing location, and land at a sufficiently low rate of descent to ensure passenger safety.

In autorotative descent, forces due to rotation of the rotor blades, upward airflow due to descent of the aircraft, and in most cases, forward motion of the aircraft, result in some portions of each rotor blade providing a "driving" region that reinforces continued rotation of the rotors as well as lift, a "driven" region that provides lift, but also drag in the direction of rotation, and a "stall" region that provides drag but little or no lift. FIG. 1 shows the various regions along the span of a rotor blade and illustrates the forces that combine to define each region. Careful use of the rotor controls allows these forces to be balanced so as to maintain approximately constant rotor speed and a relatively slow rate of descent.

Multi-copter electric VTOL designs make use of rotors with fixed blade pitch, and independently vary the rotational velocity of each rotor to provide control. For normal powered flight, varying rotational velocity can provide sufficient control, but this does not allow the degree of control required to support autorotation. Some multi-copters with many rotors can continue to sustain flight upon failure of an individual rotor, but cannot sustain flight or land safely using autorotation on a complete loss of power to most or all of the motors.

A different widely discussed architecture for electric VTOLs employs a tilt-rotor configuration, in which the lifting rotors are rotated from a position providing vertical thrust in hover, to a position providing forward thrust in cruise flight. Once in forward flight, most tilt-rotor designs include control surfaces in the wings to maintain aircraft attitude. The nacelles including the electric motors, optional gearboxes and rotors are "transitioned" over a period of several seconds, utilizing an auxiliary mechanism such as a gear-reduced electric motor. Due to the forces generated during transition while in forward flight, tilt-rotors cannot transition back to the hovering state quickly enough in an emergency situation, such as a catastrophic loss of power, before losing significant altitude. Furthermore, most tilt rotor designs have very high disk loading, which would result in a higher descent rate in autorotation than would be considered safe. These considerations necessitate landing a tilt-rotor as an airplane in an emergency power-loss situation, with forward velocity throughout the landing process. This severely limits the number of locations suitable for landing. In many locations, such as urban areas, it may not be possible to find a suitable location for airplane-like landing, critically endangering the passengers as well as those on the ground.

Another architecture for high-speed drones and electric VTOLs, which has seen great popularity for long-range military applications, is the "compound helicopter." In these designs, there are rotors for vertical lift, and separately rotors, propellers or jets for forward thrust (commonly "propulsors"). As with tilt-rotor designs, compound helicopters usually include control surfaces to direct the aircraft attitude, as the rotors are typically slowed or stopped entirely, thus losing their authority to maintain aircraft control. In theory, compound helicopters could be designed to land through autorotative descent, however existing designs do not include pitch controls to support this. As with tilt-rotor designs, these are limited to landing as an airplane, and are similarly limited to applications where such locations can be found in an emergency power-loss situation.

For small aircraft, other approaches have been used to provide safe landing in emergency power-loss situations, but each has drawbacks. Some small aircraft have been fitted with parachutes that can be opened in an emergency, slowing the aircraft's rate of descent to allow a safe landing in some conditions. In general, the elevation of the aircraft must be sufficiently high when the power fails for a parachute to be effective. Furthermore, for rotorcraft, particularly those with multiple non-ducted rotors, the cables that connect the parachute to the aircraft can in some cases become tangled in the rotors. Another approach is to provide rocket thrusters that can ignite moments before the aircraft reaches the ground to reduce the force of impact. The direction and amount of thrust may be difficult to control and thus may not provide sufficient impact reduction in many conditions.

SUMMARY OF THE EMBODIMENTS

In accordance with one embodiment of the present invention, there is provided a method of operating an electrically powered rotorcraft of the type having a fuselage and a set of N rotors, N≥4, driven by a set of electric motors and coupled to the fuselage, under a failure condition preventing ordinary operation of the rotorcraft. In this embodiment, the method includes: entering, by mechanical means, into a failsafe mode of operation wherein autorotation of at least four of the rotors is enabled; and causing, by the system controller, differential control of electrical braking of the set of rotors to affect orientation of the rotorcraft.

Optionally, the mechanical means includes a mechanical bias of each blade's angle of incidence at approximately zero degrees in the absence of rotor torque, wherein the mechanical bias is overcome when the rotor torque has exceeded a threshold.

Alternatively, or in addition, each rotor has a hub and a set of blades and the mechanical means includes a set of linkages supporting angular rotation of each blade about a lead/lag axis, as well as modulation of each blade's angle of incidence in relation to an extent of such blade's orientation about its lead/lag axis, and a mechanical bias of the angle of incidence at approximately zero degrees in the absence of rotor torque, the rotor torque when over a threshold overcoming the bias to support normal control of the angle of incidence.

Optionally, the electrical braking includes connecting a resistive load to each of the electric motors associated with the selected group of the rotors. Alternatively, or in addition, the electrical braking includes configuring each of the electric motors associated with the selected group of the rotors in relation to a set of batteries to provide regenerative braking. Optionally, the electrically powered rotorcraft has a primary battery system and a secondary battery system, the battery systems having a configuration, during ordinary operation, in which at least the primary battery powers the rotorcraft; and entering the failsafe mode of operation includes mechanically switching the secondary battery system to provide power, for control of the rotorcraft to the exclusion of the primary battery system. Optionally, the electrically powered rotorcraft has independent primary and secondary control circuits and the secondary battery system is coupled exclusively to the secondary control circuit at least when the rotorcraft is in the failsafe mode of operation.

Alternatively, or in addition, the method includes causing, by the system controller, control of the collective pitch of the blades of the rotors to maintain targeted rates of descent and forward motion.

Alternatively, or in addition, the method includes causing, by the system controller, control of cyclic pitch variation of the blades of the rotors to maintain a rate of descent and forward motion.

Optionally, each of the rotors includes a set of blades, and each blade has a coupled electric actuator configured to control pitch of such blade and causing control of electrical breaking includes controlling the electric actuator of each blades. Optionally, each of the electric motors are operatively connected to a corresponding rotor through a planetary gear system configured to avoid substantially impeding rotation of the corresponding rotor during power loss to such motor. Optionally, causing differential control of electric braking includes providing disk loading of the set of rotors such that an autorotative descent rate of the rotorcraft is less than 10 meters per second.

In accordance with another embodiment of the present invention, there is provided an electrically powered rotorcraft comprising: four rotors driven by a set of electric motors; a system controller configured (1) to control operation of the four rotors and the set electric motors and (2) to operate the rotorcraft in a failsafe mode if ordinary operation of the aircraft is ceased. Operating the rotorcraft in the failsafe mode includes: mechanically enabling autorotation of the four rotors; and causing, by the system controller, differential electrical braking of the four rotors to adjust an orientation of the rotorcraft.

Optionally, the rotorcraft comprises a mechanism within each rotor to reduce incidence angle of its rotor blades when the corresponding electric motor torque is reduced.

Optionally, causing differential electrical braking includes connecting a resistive load to each of the electric motors associated with the selected group of the rotors. Also optionally, the rotorcraft comprises a set of batteries, associated with at least one rotor, configured such that the set of batteries is recharged during electrical braking of the at least one rotor.

Optionally, the rotorcraft includes a primary battery system and a secondary battery system, the battery systems having a configuration, during ordinary operation, in which at least the primary battery system powers the rotorcraft; and operating in the failsafe mode of operation includes configuring the secondary battery system to provide power for control of the rotorcraft, to the exclusion of the primary battery system. Also optionally, the rotorcraft has independent primary and secondary control circuits and the secondary battery system is coupled exclusively to the secondary control circuit at least when the rotorcraft is operating in the failsafe.

Optionally, operating the rotorcraft in the failsafe mode includes controlling the collective pitch of the blades of the rotors to maintain targeted rates of descent and forward motion. Also optionally, operating the rotorcraft in the failsafe mode includes controlling the cyclic pitch of the blades of the rotors to maintain targeted rates of descent and forward motion.

Another embodiment of the invention is a method of operating an electrically powered rotorcraft having a fuselage and a set of N rotors driven by a set of electric motors and coupled to the fuselage, N≥4, as well as a system controller configured to control operation of the set of N rotors. The method operating under a failure condition preventing ordinary operation of the rotorcraft and comprising, under the failure condition: entering, by the system controller, into a failsafe mode of operation wherein autorotation of at least four of the rotors is enabled; and causing, by the system controller, control of electrical braking of each rotor in the set relative to electrical braking of each other rotor in the set, to affect pitch, roll and yaw of the aircraft.

Optionally, the method includes causing, by the system controller, control of the collective pitch of the blades of the rotors to maintain a rate of descent and forward motion. Alternatively, or in addition, the method includes causing, by the system controller, control of cyclic pitch variation of the blades of the rotors to maintain a rate of descent and forward motion. Also optionally, each of the rotors includes a set of blades, and each blade has a coupled electric actuator configured to control pitch of such blade, wherein causing control of electrical breaking includes controlling the electric actuator of each blade.

Optionally, each of the rotors includes a set of blades, and each blade includes an electric actuator configured to control pitch of such blade. Optionally, each of the electric motors are coupled to a corresponding rotor through a planetary gear system design configured to avoid substantially impeding rotation of the corresponding rotor during power loss to such motor. Optionally, operating the rotorcraft in the failsafe mode further includes providing disk loading of the set of rotors such that an autorotative descent rate of the rotorcraft is less than 10 meters per second.

In yet other embodiments, the rotorcraft includes novel rotor hubs as disclosed in U.S. Provisional Application No. 63/359,944, "Rotor System for Electrically Powered Rotorcraft," filed Jul. 11, 2022. These novel rotor hubs have a torque-actuated mechanical feature that causes the rotor blade incidence to be about 10 degrees when drive motor torque is within a normal range for powered flight, though drop back to a rotor blade incidence of about 0 degrees when drive motor torque falls below a threshold value. This feature ensures that the reverse flow of air occurring during a rapid descent is sufficient to sustain the rotors in a windmilling state of autorotation. Once autorotation has been initiated, such embodiments use differential electrical braking to control the yaw, pitch and roll of the rotorcraft.

BRIEF DESCRIPTION OF THE DRAWINGS

The foregoing features of embodiments will be more readily understood by reference to the following detailed description, taken with reference to the accompanying drawings, in which.

DETAILED DESCRIPTION OF SPECIFIC EMBODIMENTS

Definitions. As used in this description and the accompanying claims, the following terms shall have the meanings indicated, unless the context otherwise requires:

A "set" includes at least one member.

A "flare" is a maneuver by a rotorcraft to reduce both vertical and horizontal speed to allow a slow-speed touchdown.

"Electrical braking" of a rotor in a rotorcraft, powered by an electric motor and in autorotation mode, includes a process selected from the group consisting of (i) placing a resistive load on the electric motor, (ii) configuring the motor in relation to a battery to provide regenerative braking, and (iii) combinations of the foregoing.

"Adjusting orientation" of a rotorcraft includes controlling a member selected from the group consisting of: the rotorcraft's pitch, roll, yaw, and combinations thereof.

Embodiments of the present invention are directed to an electrically powered multi-rotor VTOL capable of autorotative landing. Unlike other multi-rotor VTOLs, these embodiments are distinguished by several characteristics that allow autorotation to support safe landing in the event of engine failure or loss of power. Furthermore, as VTOLs for urban air transport may use less skilled pilots than those trained to fly helicopters, some embodiments of the present invention provide semi-autonomous control of autorotative landing, which reduces the burden on the pilot during this procedure and thus may reduce the training required. Other embodiments, for VTOL applications in which there is no pilot, provide fully autonomous control of autorotative landing.

Figure 2:
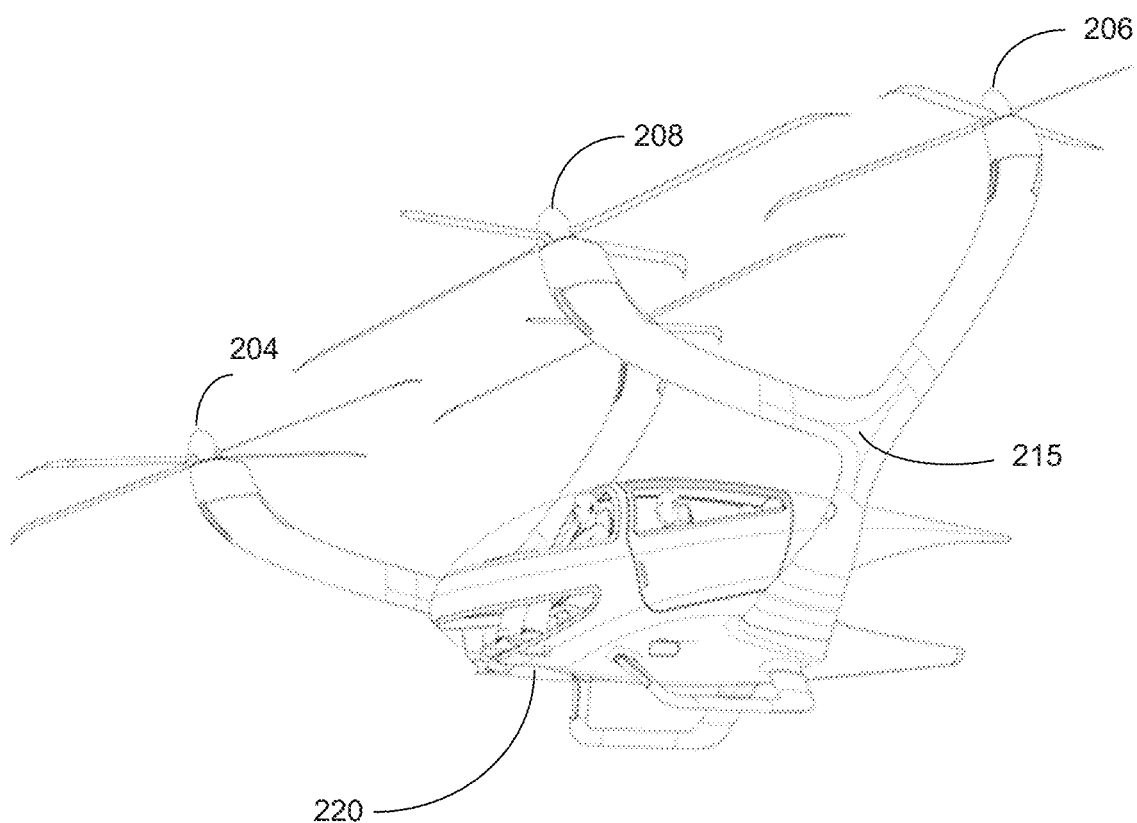
FIG. 2 is a side perspective view of a rotorcraft, in flight, in accordance with an embodiment of the present invention.
Figure 3:
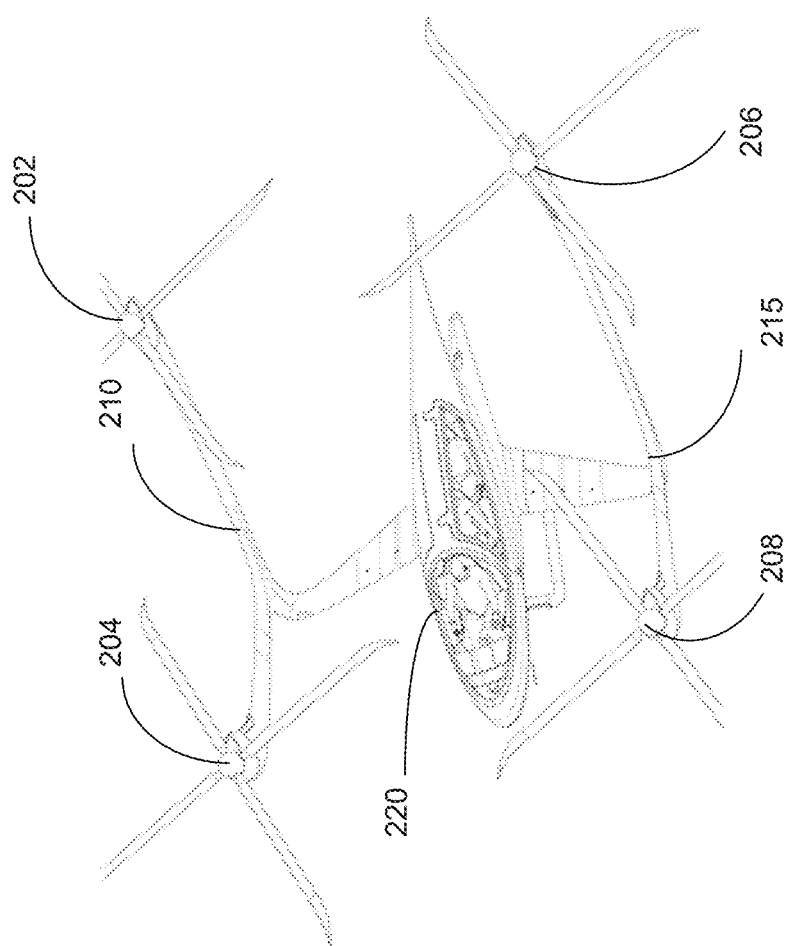
FIG. 3 is a top perspective view of the exemplary rotorcraft of FIG. 2 in flight.

In accordance with an embodiment of the present invention, there is provided a rotorcraft in a quad-copter configuration, with four rotors, each driven by an electric motor. FIG. 2 and FIG. 3 provide two views of the exemplary rotorcraft of this embodiment. In particular, FIG. 2 is a side perspective view of the exemplary rotorcraft in flight. FIG. 3 is a top perspective view of the exemplary rotorcraft in flight. In the embodiments of FIGS. 2 and 3, the rotorcraft has a structural support system that includes a first structural member 210 affixed to the right side of the fuselage 220, and a second structural member 215 affixed to the left side of the fuselage 220. The first structural member 210 mounts a first set of rotors 202, 204 to the fuselage 220, and the second structural member 215 mounts a second set of rotors 206, 208 to the fuselage 220. The embodiment of the rotorcraft in FIGS. 2 and 3 has four rotors 202, 204, 206, 208, whereas other embodiments may have additional rotors, with similar characteristics to those described for the four-rotor system. In the embodiment of the rotorcraft in FIGS. 2 and 3, each rotor 202, 204, 206, 208 is electrically powered. Other embodiments may have other means of powering the rotors.

In one embodiment, power is provided to the motors of the rotorcraft via electric batteries that are charged when not in flight. In alternative embodiments, power may be provided to the rotorcraft via hydrogen fuel cell, or a battery charged in-flight by a combustion engine generator.

In one embodiment, each rotor of the rotorcraft rotates on one of four distinct shafts. In other embodiments, there may be compound rotors, with more than one rotor at each shaft position, each rotating around a common shaft, or rotating about separate coaxially aligned shafts.

In an exemplary rotorcraft in accordance with an embodiment of the present invention, autorotation may be invoked to allow a safe landing in the event of one of several potential failure modes. Examples of such failure modes include complete drainage of power from the main battery system (also referred to as the primary battery system) that provides power to the motors that power the rotors; failure of the main battery system; and failure of one or more motor controllers associated with the motors that power the rotors. In one embodiment, autorotation under any of these failure modes is supported. Other embodiments detect and distinguish between failure modes and operate differently depending on which failure modes are present.

In one embodiment, the following characteristics allow safe autorotative landing of the rotorcraft, each described in subsequent sections.

(1) Upon power loss or engine failure, the rotors remain free to continue spinning with little resistance to continued rotation, except when such resistance is needed to aid in maneuvering.

(2) The rotors allow the pitch of the blades to be configured under control of the pilot, an automatic control system, or both, and can be reconfigured quickly, spanning the entire operating range within the two to three seconds typically needed to initiate autorotation.

(3) The disk loading of the rotor system, which is the ratio of aircraft weight to rotor area, is sufficiently low to allow a sufficiently low descent velocity during autorotation for a safe landing for the passengers and pilot.

(4) The aircraft allows sufficient mechanisms to maneuver during autorotation, when there is no power to drive rotation of the rotors through the motors. Such maneuverability allows the pilot, or an automated control system, to direct the aircraft to the safest available landing location.

(5) The power to drive all of the mechanisms needed to support the above behaviors is provided by a power system separate from the main power system of the VTOL that drives the rotors. The separation is sufficient to ensure that a failure of the main power system is very unlikely to result in failure of this power system.

Figure 4:
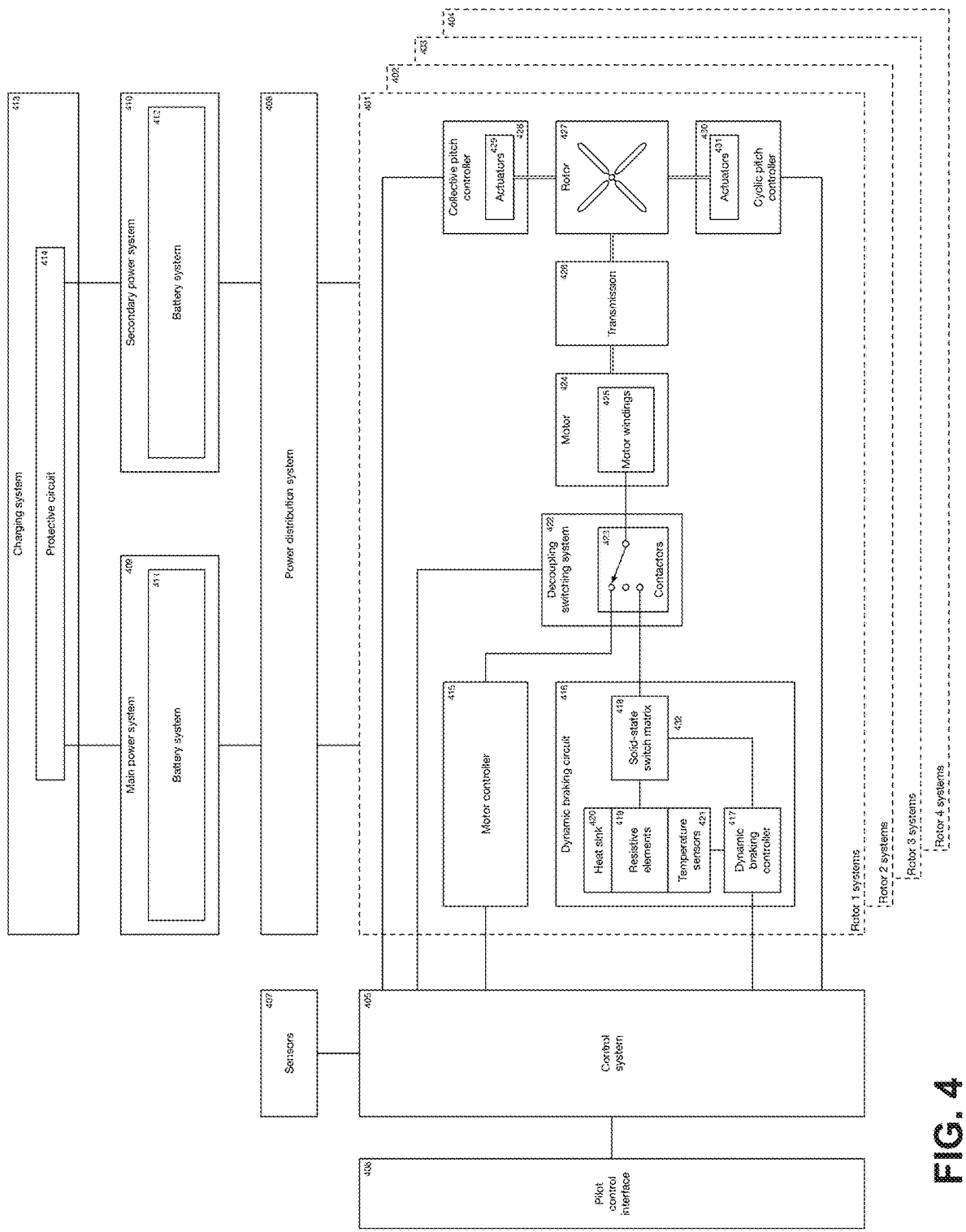
FIG. 4 is a block diagram illustrating an exemplary rotorcraft control environment that includes a set of systems used to provide a safe autorotative landing process in embodiments of the present invention, and the general relationships among these systems.

FIG. 4 is a block diagram illustrating an exemplary rotorcraft control environment that includes a set of systems used to provide a safe autorotative landing process in embodiments of the present invention, and the general relationships among these systems. Some embodiments include a subset of the systems shown in FIG. 4. Some embodiments include additional systems described herein but not illustrated in FIG. 4.

The embodiments of FIG. 4 include systems that provide a safe autorotative landing process for a rotorcraft with four rotors. Each rotor of the rotorcraft is associated with a respective set of rotor systems. The first rotor 427 is associated with Rotor 1 systems 401, the second rotor is associated with Rotor 2 systems 402, the third rotor is associated with Rotor 3 systems 403, and the fourth rotor is associated with Rotor 4 systems 404. Only the set of systems associated with the first rotor 427, Rotor 1 systems 401, are shown and described in detail. The corresponding sets of systems 402, 403, 404 associated with the other three rotors are not shown or described in detail, but are equivalent to the Rotor 1 systems 401 associated with the first rotor 427. In other embodiments with a different total number of rotors, an equivalent set of systems is associated with each of that number of rotors.

The sub-processes of the autorotative landing process, in embodiments of the present invention, are primarily coordinated by a control system 405. In some embodiments, this control system 405 is implemented using one or more computer systems onboard the aircraft. The control system 405 incorporates a temporal sequence of inputs providing information from various sources. In some embodiments, the control system 405 is communicatively coupled to sensors 407 and incorporates inputs from sensors 407 that measure aspects of the aircraft's current state. In some embodiments, the inputs from these sensors 407 include information about the aircraft's state of flight, such as its altitude, spatial position, airspeed, acceleration, rotation rate, etc.; and information about the state of various aircraft components, such as battery systems, motor controllers, etc. In some embodiments, the control system 405 also includes inputs from the pilot, provided via a pilot control interface 406 communicatively coupled to the control system 407. The control system 405 is also communicatively coupled to each of the set of rotor systems, Rotor 1 systems 401, Rotor 2 systems 402, Rotor 3 systems 403, and Rotor 4 systems 404.

Rotors Free to Rotate

To support characteristic (1), in one embodiment, if there is a failure that results in loss of power to one or more of the motors that drive the rotors, a circuit switches each such motor to a state that provides minimal mechanical resistance to continued rotation. For example, in the embodiment of FIG. 4, if power is lost to motor 424 that drives the first rotor 427, a circuit switches motor 424 to this state. In some embodiments, this circuit detects certain failure conditions and automatically switches the motor to this state. In these embodiments, the circuit also notifies the control system that a failure condition has been detected and that the motor has been switched to this state. In some embodiments, this circuit can also be switched to this state under the direction of the control system, which may result from detection of certain failure or low-battery conditions by the control system. In some embodiments, the control system is notified of a failure leading to one or more motors being switched to this state, the control system will direct the remaining motors to also switch to this state.

In the embodiment of FIG. 4, as shown with respect to the Rotor 1 systems 401 associated with the first rotor 427, this circuit is included as part of a decoupling switching system 422 having a set of contactors 423 that together electrically disconnect each of the motor windings 425 of motor 424 from the motor controller 405, leaving each in an open circuit configuration. In this embodiment, the back electromotive force (EMF) that results from continued rotation of the rotors does not result in current flow that would dissipate the energy of rotation. In the embodiment of FIG. 4, as shown with respect to the Rotor 1 systems 401, a motor controller 415, which includes switching elements that electronically control the connection of the set of windings 425 to the power source, is configured to automatically fail-over to an open circuit configuration either upon failure of the motor controller 415 itself, or upon detection of loss of power or other failure that would result in autorotative descent.

Also to support characteristic (1), in the embodiment of FIG. 4, the main motor connects to an associated rotor through a transmission, such as a planetary gear system. For example, as shown with respect to the Rotor 1 systems 401, main motor 424 connects to the first rotor 427 through transmission 426. The planetary gear system is designed to avoid substantially impeding the continued rotation of the rotor in the event of loss of power to the corresponding motor. In other embodiments, a motor and its corresponding rotor are directly connected.

Under some conditions, resistance is explicitly provided to the rotation of a particular rotor to aid in maneuvering. In such cases, there may be periods of time in which free rotation of that rotor is limited by the desired resistance. More detail on this case is described in a subsequent section.

Rotor Blade Pitch Control

To support characteristic (2), in the embodiment of FIG. 4, the collective pitch of each blade of a rotor is adjusted via an electric actuator coupled to the respective blade. As shown with respect to the Rotor 1 systems 401, the collective pitch of the blades of the first rotor 427 is adjusted by the set of actuators 429, which is controlled by a collective pitch controller 428 under the direction of the control system 405. In some embodiments, each actuator 429 includes an electric motor; while in other embodiments, this actuator is a linear actuator. In a further related embodiment, each rotor has four blades, uniformly distributed around the central axis; while, in other embodiments, there may be two or more blades on each rotor. In this further related embodiment, for each rotor, a single actuator couples to all of the associated blades. In other embodiments, there are separate actuators coupled to one or more of the blades. In one embodiment, the actuators allow the blade pitch of a rotor to be adjusted rapidly, allowing change in blade pitch over the full range of configurations within the two to three seconds typically needed to initiate autorotation.

In the embodiment of FIG. 4, a set of actuators coupled to each rotor allows control of the cyclic pitch variation. As shown with respect to the Rotor 1 systems 401, the set of actuators 431 are coupled to the first rotor 427 and the set of actuators 431 are controlled by a cyclic pitch controller 430 under the direction of the system controller 405. In some embodiments, the rotor mechanism includes a swash plate coupled to one or more actuators 431 to control the cyclic pitch variation. Typically, both the magnitude and phase of the cyclic pitch variation are controlled, but, in some embodiments, control extends only over the magnitude. In some embodiments, a set of coupled actuators jointly controls both the collective and cyclic pitch degrees of freedom for a rotor, while, in other embodiments, the collective and cyclic pitch are controlled by independent actuators, such as actuators 429, 430 of FIG. 4. Cyclic pitch variation is used generally to help balance the asymmetry of lift in forward flight, which comes about as a result of the variation in airflow over each blade as it rotates through a full rotation.

Figure 1:
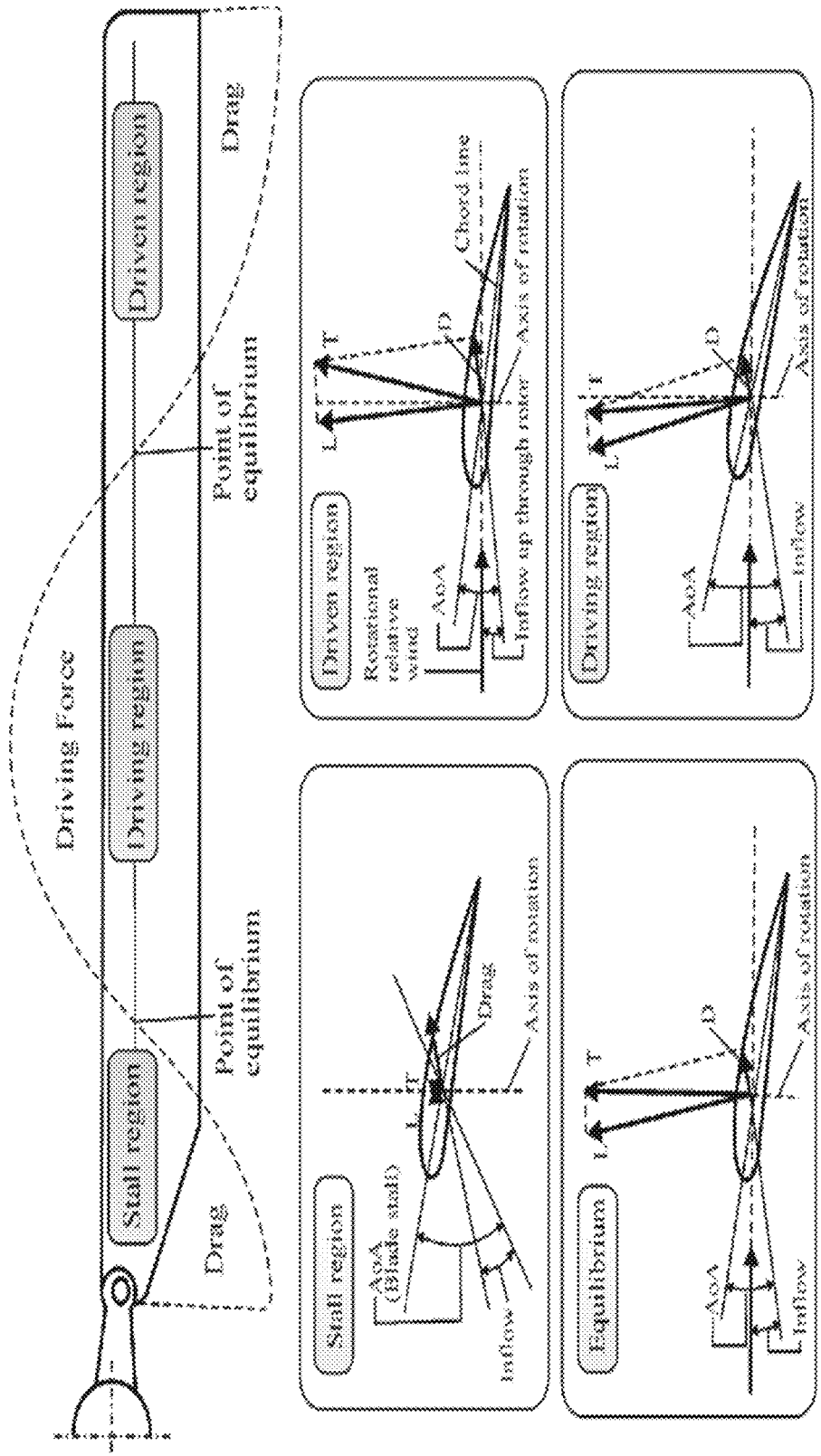
FIG. 1 is a diagram illustrating the regions of autorotative force along a blade span of a rotating wing of a rotorcraft.

As shown in FIG. 1, which illustrates regions of autorotative force along a blade span of a rotating wing of rotorcraft, the aircraft's forward velocity introduces an air velocity component experienced by each blade of the rotor depending on the angular orientation of the blade in the course of its rotation. In particular, when the blade is on the advancing side (at 90° relative to the forward velocity of the aircraft), the forward velocity of the aircraft adds to the air velocity over the blade attributable to its rotation, whereas, when the blade is on retreating side (at 270° relative to the forward velocity of the aircraft), the forward velocity of the aircraft subtracts from the air velocity over the blade attributable to its rotation. When the blade is at 270°, air flow over the blade near the hub of the rotor therefore slows significantly and may even be negative, so that the blade produces little lift in this angular orientation, and when the blade reaches the 0° position, the sudden resumption of large positive flow over the blade produces a sudden resumption of lift by the blade. For this reason, cyclic pitch variation can help to compensate for this effect by increasing the blade pitch when the blade is at the 270° position.

Low Disk Loading

To support characteristic (3), in one embodiment, the aircraft has a disk loading of approximately 3 lbs/ft². For an aircraft with a fully loaded weight of 2,700 lbs., this corresponds to 900 ft² over all four rotors, or a diameter of 16.9 ft for each rotor. Using commonly used assumptions for rotorcraft, one can estimate the minimum rate of autorotative descent based on empirical studies show that the minimum ratio $$\frac{V_d}{v_h}$$

of descent velocity, $V_d$, to the induced air velocity in hover, $v_h$, is approximately 0.8. This minimum is generally obtained when the forward speed, $V_f$, such that the ratio $$\frac{V_f}{v_h}$$

is in the range of approximately 2 to 4. Here, the induced velocity in hover is defined as $$v_h = \sqrt{\frac{T}{2\rho A}},$$

where T is the thrust, which at an equilibrium descent rate corresponds to the weight of the aircraft, ρ is the air density, A is total rotor area. Using the characteristics of this embodiment, the estimated minimum descent rate is approximately 6 meters per second.

A descent velocity in the range of 6 meters per second is well within the range generally considered a safe rate of descent in an emergency situation. A descent rate of up to approximately 10 meters per second is generally considered safe for typical helicopters, though the specific maximum depends on the details of the helicopter construction. Because the descent velocity varies approximately as the square root of the disk loading, greater than approximately 3 times the preferred disk loading would result in a minimum rate of descent at a rate greater than would generally be considered safe for most rotorcraft.

Maneuverability in Autorotation

To support characteristic (4), in the embodiment of FIG. 4, the blade pitch of each rotor can be independently adjusted. In this embodiment, the control of blade pitch of each rotor is effectuated by controlling such rotor's collective pitch. As shown with respect to the Rotor 1 systems 401, control of the collective pitch is made by the collective pitch controller 428 under the direction of the system controller 405. In the embodiment of FIG. 4, two of the rotors rotate in the opposite direction of the other two in order to eliminate the effects of torque in normal flight, and to avoid the need for a tail rotor typically used in helicopters. Specifically, there is a first pair of diagonally disposed rotors having a similar direction of rotation, with a second pair of diagonally disposed rotors having the opposite direction of rotation. In normal powered flight, both the rotational velocity and the blade pitch of the rotors can be independently controlled to provide control of pitch, roll, and yaw. In autorotation, blade pitch can be adjusted to similarly vary the lift provided by each rotor and similarly vary at least the pitch and roll of the aircraft. Adjustment of the blade pitch allows independent control over lift and rotation speed during autorotation for each rotor. Control of the differential lift between rotors allows a degree of maneuverability. For example, roll rotation to the left can be initiated by increasing lift of the right-hand two rotors, while pitch rotation to the rear can be initiated by increasing the lift of the front two rotors.

In autorotation while the rotors are rotating freely, control of the rotation rate of each rotor and control of the strength and direction of thrust from each rotor can be achieved only by controlling the blade pitch of each rotor. As shown with respect to the Rotor 1 systems 401, such adjustments of the blade pitch are made by the collective pitch controller 428 under the direction of the system controller 405. During the steady descent phase of autorotative landing (Phase II, as described with respect to FIG. 5), the goal of the pilot or control system 405 is to simultaneously maintain an approximately constant descent speed, forward speed, attitude, and rotor rotation rate; each within a safe operating range. To do this, the overall vertical lift must balance the aircraft weight; the overall forward thrust must balance the corresponding drag; the thrust moment from each rotor around the aircraft's center of mass must balance; and the rotational forces on each rotor blade must balance on average over the full rotation of a blade. The blade pitch of each rotor is adjusted independently in order to reach such an equilibrium with a stable combination of descent speed, forward speed, attitude, and rotation rate. As conditions change during descent, the pilot or control system can continuously or periodically refine the blade pitch of each rotor to maintain an equilibrium.

In addition to maintaining a stable attitude during the steady descent phase of autorotative landing, attitude control is needed to allow the pilot or control system 405 to establish the initial direction of descent, and to steer the aircraft toward a safe landing location as the descent proceeds. Some degree of control of all axes of attitude is needed throughout autorotative descent, although, during much of the descent, only occasional adjustments are needed. While control of the blade pitch and the resulting effect on the relative thrust provided by each rotor allows control over the overall pitch and roll of the aircraft, with a typical rotor configuration this does not provide significant control over the yaw. In normal powered flight, the relative torque on each rotor can be adjusted to provide control over yaw. But when the rotors are spinning freely, there is virtually no torque being supplied to the rotors, so yaw cannot be controlled in this manner. Instead, in one embodiment, a mechanism provides selective resistance to rotation under conditions providing control over the selection of each affected rotor, time of application of the resistance, and duration of the resistance.

In the embodiment of FIG. 4, when the aircraft is in autorotative descent, as shown with respect to Rotor 1 systems 401, the motor windings 425 are electrically connected to the decoupling switching element 422 that can be configured to be connected to a dynamic braking circuit 416 that includes one or more resistive elements 419. When a period of resistance to rotation is needed, a switch matrix 418 is configured to connect the motor windings 425 via the switching element 422 to the resistive elements 419, such that the back-EMF from each winding generates a current, converted by the resistive element to heat. In some embodiments, each switching element that connects each motor winding to the dynamic braking circuit is a contactor 423. In the embodiment of FIG. 4, the switch matrix 422 that connects each motor winding 425 to resistive elements 419 is a solid-state switch matrix. In some embodiments, each switching element 422 of this solid-state switch matrix 422 incorporates one or more insulated-gate bipolar transistors (IGBT), bipolar junction transistors (BJT), or metal-oxide-semiconductor field-effect transistors (MOSFET).

In the embodiment of FIG. 4, the dynamic braking circuit 416 includes switching elements to control the average power dissipated in the resistive elements 419, and thus the average rotational resistance. Also, in this embodiment, the dynamic braking circuit 416 provides an intermittent electrical connection from the motor windings to the resistive elements 419 such that a control input 432 from a dynamic braking controller 417 regulates the duty cycle of this connection via switch matrix 418. The duty cycle is the ratio of the average time the connection is established to the average time the connection is prevented. In some embodiments, pulse width modulation is used to determine the duty cycle of this connection given the control input 432.

Since it is important to maintain sufficient rotational energy in the rotors during autorotative descent to ensure a safe landing, dynamic braking is expected to be used sparingly, and thus the total heat dissipated by the resistive elements will be limited. In the embodiment of FIG. 4, each resistive element 419 is coupled to a heat sink 420, over which air can flow when in autorotative descent. The power rating of each resistive element 419, the thermal coupling of each resistive element to a heat sink 420, and the size and positioning of each heat sink in the expected airflow, can be chosen using common design methodologies. In the embodiment of FIG. 4, one or more temperature sensors 421 on the resistive elements 419 are used by a dynamic braking controller 417 to regulate the average dissipation to avoid the temperature of the resistive element exceeding a safe limit. In some embodiments, the resistive elements 419 are each cooled by a water-based or other fluid-based cooling mechanism.

In embodiments other than the embodiment of FIG. 4, there is no cyclic control of blade pitch present in the rotorcraft control environment.

In various embodiments of the present inventions, the motor controller is a bi-directional controller that during autorotation can be configured to provide regenerative braking, where instead of dissipating the rotational energy through a resistive element as heat, it instead allows the motor to be used as a generator, driving current into the battery system. In these embodiments, regenerative braking is engaged only under the condition of loss of power due to a discharged battery. For other failure modes, which may include, for example, a short circuit of the battery itself, wherein it may be unsafe to use regenerative braking, the motor windings are instead coupled to a resistive braking system, as described previously. In the regenerative embodiment, a detection mechanism determines if the failure is due to a discharged battery and, if so, the mechanism connects the motor windings to the regenerative braking system, and otherwise to the dynamic braking system.

In some embodiments, the motors that drive the rotors may include redundant windings that allow the motor to be used in the event of failure of some of the windings. For example, a motor may include two independently connected windings at each angular position that would otherwise include a single winding. In such cases, in some embodiments, a switching circuit is used to connect all of the windings to a dynamic braking circuit when dynamic braking is in use; while in other embodiments, a switching circuit connects only a subset of the sets of motor windings to a dynamic braking circuit, leaving other windings in an open circuit condition.

In one embodiment, as described above, the pilot or control system can control the timing and degree of resistance provided to each rotor, using the control inputs to the switching circuit and dynamic braking circuit described above. Providing resistance to the rotation of a rotor while it is rotating has the effect of imparting torque to the aircraft as some of the rotational energy of the rotor is coupled to the aircraft frame. The pilot or control system may use this effect to control the overall yaw of the aircraft, for example, by selectively providing resistance to one pair of diagonally disposed rotors that are rotating in a common direction.

In some cases, this effect can also be used to slow the rate of rotation of any subset of rotors at the discretion of the pilot or control system, potentially in conjunction with the blade pitch controls, providing additional means of controlling rotor speed if needed.

In some embodiments, the rotors allow control not only of collective blade pitch but also cyclic pitch variation. In such embodiments, for each rotor, adjustments of cyclic pitch variation are made by the cyclic pitch controller, such as cyclic pitch controller 430 of Rotor 1 systems 401, under the direction of the system controller 405. While cyclic pitch variation is not necessary during autorotative descent, when available, control of cyclic pitch variation provides additional degrees of control to the pilot or control system in balancing the forces and torques described above. If at all possible, an autorotative descent should include forward motion to help minimize the rate of descent, in which case there will be some asymmetry of lift across each rotor blade. The pilot or control system may adjust the cyclic pitch to reduce this asymmetry when attempting to maintain a stable descent.

In some embodiments, each rotor blade has a twist configuration, in which the pitch of the blade varies along the length of the blade. As is common in rotorcraft blades, in these embodiments, the pitch of the blade decreases along the length from the root to the tip, to partially account for the variation in linear air velocity over the blade when rotating. In other embodiments, the pitch of each rotor blade is approximately constant over the span of the blade.

In some embodiments, the planes of rotation of the respective four rotors are not parallel but are tilted slightly in a dihedral configuration. A dihedral configuration of rotors can provide improved stability of flight. In one embodiment with four rotors arranged in a square configuration, each of the rotors has a dihedral angle of approximately 2 degrees, both in the transverse and longitudinal directions. In other embodiments, there is dihedral tilt in one of these directions only. In embodiments with additional rotors, the dihedral tilt is a function of the transverse and longitudinal position of the rotor center, with tilt changing monotonically as a function of each of these positions.

Separate Power System

Returning now to FIG. 4, to support characteristic (5), the embodiment of FIG. 4 includes a secondary power system 410 separate from the main power system 409 used to drive the rotors. This secondary power system includes a separate source of power, which in this embodiment, is a separate secondary battery system 412. The storage capacity for this secondary battery system is a small fraction of the capacity of the main battery system 411, as the power requirements are significantly smaller than those of the main power system 409. The storage capacity of this secondary battery system is sized to provide at least as much operating time as the main battery system, under conservative conditions of use. A power distribution system 408 connects power from each of the main power system 409 and secondary power system 410 to the appropriate set of aircraft systems. As described below, in some embodiments, these connections are permanently wired, while in other embodiments, the power distribution system includes a switching mechanism to allow power to subsets of aircraft systems to be directed from a selected power system.

When the aircraft is being charged on the ground, in this embodiment, a common charging system 413 charges both the secondary power system 410 and the main power system 409. Once the aircraft is disconnected from the charging source, a protective circuit 414 disconnects the two power systems so that malfunction of the main power system will not disrupt the power system needed for autorotation.

In some embodiments, the secondary power system that is used during autorotation provides power for all of the systems that continue to be needed during autorotation, including the use of those systems during normal flight. These include the circuit to ensure the motors do not impede rotation of the rotors and to switch to dynamic breaking or regenerative braking mode, if needed; the actuators and associated controllers that allow control of the blade pitch; the control systems, sensors, and controls that allows the pilot to control the aircraft; and any automatic or semi-automatic control system that assists the pilot in adjusting the blade pitch during autorotation, and all associated computing subsystems. In these embodiments, the capacity of the secondary battery system must be sufficient to supply power to the connected systems both during the full course of normal flight, as well as during autorotative landing.

In other embodiments, during normal flight, the two battery systems described above are coupled so that the secondary battery system can receive power from the main battery system, while simultaneously powering the connected systems. A corresponding coupling circuit prevents power from flowing in the opposite direction from the secondary battery system to the main battery system. In case of failure of the main battery system that results in initiation of autorotative descent, the secondary battery alone provides power to all of the connected systems, which include all those needed for autorotative landing. By allowing the secondary battery to be charged during normal flight from the main battery, the discharge rate of the secondary battery during this period can be reduced below that required to power the connected systems. In this case, the capacity of the secondary battery system must be sufficient to discharge at this reduced rate for the duration of normal flight, and also to power the connected systems during the entire autorotative landing. In some embodiments, the available power from the main battery system that can be coupled to the secondary battery system is enough to maintain a full charge on the secondary battery system. In this case, the capacity of the secondary battery system must be sufficient only to supply power to the connected systems during the entire autorotative landing.

In other embodiments, during normal flight, some or all of these systems are powered by the main power system, which also powers propulsion of the rotors, while on either loss of power of the main power system or detection of another type failure that results in autorotative descent, a set of automatic fail-over switches in a power distribution system redirects power to those systems from the secondary power system used for autorotation. In some embodiments, each fail-over switch is a contactor controlled by a fail-over detection circuit. In this embodiment, the capacity of the secondary battery system must be sufficient to supply power to the connected systems during autorotative landing, allowing for any self-discharge that may occur during the normal flight prior to initiation of autorotation; but need not include sufficient capacity to power these systems during normal flight.

In one embodiment, some or all of the systems used during autorotative descent are separate from similar systems that perform a similar function during normal flight and are powered by the separate secondary power system used for autorotation. This embodiment is configured to tolerate failure of any of normal power systems, which might otherwise interfere with both normal flight and autorotative descent, so as to power a successful autorotative descent. For example, a main control computer system powered by the main power system may be used during normal flight, while on any failure that would result in autorotative descent, which in this case may include failure of the main control computer system itself, a secondary control computer system powered by the separate secondary power system would be used to control the autorotative descent. Appropriate automatic fail-over switches allow this computer to take over control of the controllable elements, such as blade pitch, during autorotative descent.

Control of Autorotative Descent

In some embodiments, the pilot provides the control inputs to the aircraft for autorotative descent via an electromechanical control interface. In some embodiments, this is the same control interface available to the pilot during normal flight. In some embodiments, this control interface is mapped to controls similar to those typically used in helicopters. That is, a control to adjust the overall collective pitch over all rotors; a control to adjusts the roll and pitch of the aircraft, similar in function to a cyclic control on a helicopter, but using the four rotors as described above to perform this function; and pedals to adjust the yaw of the aircraft. In this case, a control system maps the actions of the pilot, received through a pilot control interface, to the actions that are controllable during autorotative descent, specifically to the blade pitch control system and associated actuators associated with each rotor, such as actuators associated with the first rotor. In one embodiment, to the dynamic braking circuit, such as associated with the first rotor, that either maintains free motion of the rotor, or provides resistance to the rotor, as described above. In this embodiment, the pilot is given sufficient control to guide the aircraft through all phases of autorotative descent. Additional controllable elements may also be mapped either directly or indirectly to the pilot's controls, such as control of the cyclic pitch variation in embodiments that include such control, which unlike a helicopter is not directly associated with pitch and roll control of the aircraft.

In other embodiments, an automatic control system provides some or all of the inputs to the controllable elements during autorotative descent. In some embodiments, this control system performs that steps needed to establish, maintain, and complete an autorotative descent and landing, described in further detail below, while the pilot maintains control of the direction of flight and is responsible for choosing and guiding the aircraft to a safe landing location. In other embodiments, the automatic control system is responsible for controlling all aspects of autorotative descent and landing, including guiding the aircraft to a safe landing location.

In embodiments that include partial or complete automation of the steps in performing autorotation, a user interface mechanism is provided that allows the pilot to override the automation and perform some or all of these steps manually via a pilot control interface 406.

Figure 5:
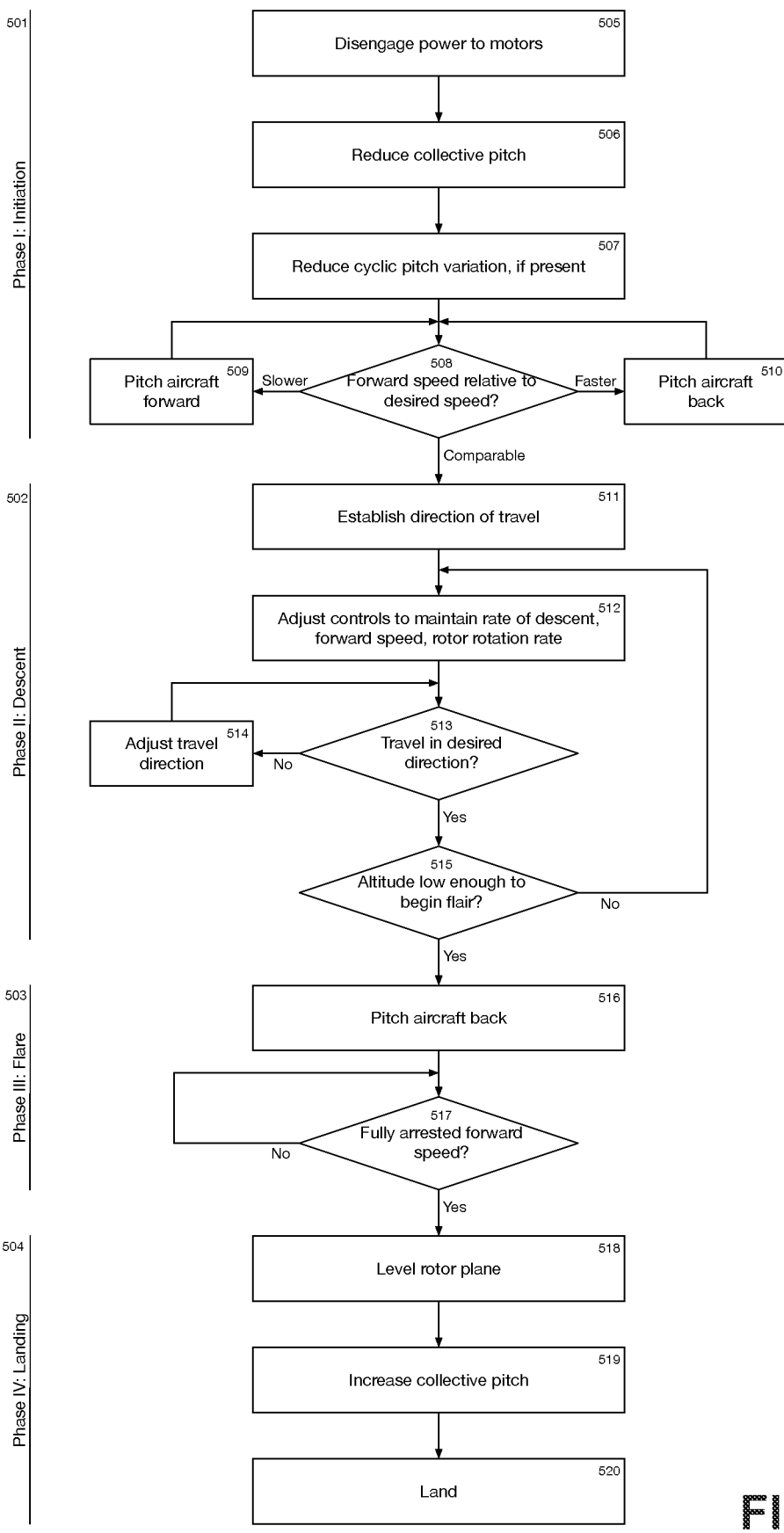
FIG. 5 is a flow diagram illustrating the four distinct phases of a safe autorotative landing process, in accordance with an embodiment of the present invention.

FIG. 5 is a flow diagram illustrating the four distinct phases of a safe autorotative landing (descent) process, in accordance with an embodiment of the present invention. These phases are similar to the autorotation phases performed by helicopter pilots. Specifically, the phases are (I) initiation of autorotative descent 501, (II) descent while maintaining rotational velocity of the rotors 502, (III) when nearing the ground, a maneuver commonly known as "flare" (to reduce both vertical and horizontal speed to allow a near zero-speed touchdown) 503, and (IV) landing 504. While FIG. 5 is illustrative of the sequence of events of the autorotative descent process in an embodiment of the present invention, in some cases, multiple steps shown in the figure may occur simultaneously or overlap, and in some cases, the specific order of steps may differ from the order shown.

As soon as a failure requiring autorotative descent and landing is detected, either automatically by the control system or by the pilot, the pilot or automatic control system initiates the autorotative descent process, starting with phase I 501, as shown in FIG. 5, initiation of autorotative descent 501. In embodiments where some or all of the autorotation steps are performed by the control system, if the failure leading to autorotation is detected by the pilot, a user interface, such as an activation button, is provided to allow the pilot to indicate that the control system should initiate autorotation. If the autorotation steps are performed directly by the pilot, the pilot uses the electromechanical controls described above to directly initiate the actions used in phase I.

On initiation of phase I of the autorotation process, the steps taken are to rapidly arrest the rate of descent and begin to adjust the rate of forward speed to a rate desirable for autorotation. In some embodiments, the following actions are taken immediately to initiate phase I: the circuit that disengages power to the motors, as described above with respect to circuit 422 of FIG. 4, is activated in sub-process 505; the collective pitch of all rotors is reduced as quickly as possible to a small value that may depend on the current attitude and forward airspeed of the aircraft in sub-process 506; and in embodiments in which the rotors include controllable cyclic pitch variation, the cyclic pitch variation is reduced as quickly as possible to a small value, which may be zero or very close to zero, such as one or two degrees of cyclic variation in sub-process 507.

In addition to reducing the collective pitch, if the average plane of the rotors had been pitched forward for forward flight, the collective pitch of the front rotors is used to significantly reduce the forward pitch of the average rotor plane to nearly horizontal, with only a slight forward pitch remaining, on the order of a degree. This can be achieved by the pilot or control system by briefly increasing the collective pitch on the front rotors relative to the rear rotors, to pitch the aircraft back.

Depending on the forward speed of the aircraft before autorotation has commenced, an initial period of speed adjustment may be necessary to reach a desirable forward speed for autorotation 508, and this is used to determine the forward tilt of the rotor coming out of phase I. In one embodiment, a desirable forward speed is 60 knots. If the initial speed had been greater than this, the pilot or control system can initially pitch the aircraft further back than the average rotor pitch angle described above, providing additional forward drag until the desired speed is reached in sub-process 510. Similarly, if the initial forward speed had been lower than the desired forward speed for autorotation, the pilot or control system can initially pitch the aircraft further forward than the average rotor pitch angle described above, providing additional forward thrust until the speed has reached a desirable value in sub-process 509.

Once the steps in phase I have been completed, the pilot or control system begins to perform the actions that compose phase II 502, as shown in FIG. 5, descent while maintaining rotational velocity of the rotors, which lasts until the aircraft nearly reaches the ground. The initial part of phase II entails establishing a desirable direction of travel and forward speed in sub-process 511, while the remainder of phase II entails maintaining an approximately constant rate of descent, forward speed, attitude, and rate of rotor rotation for all rotors, while making adjustments as needed to guide the aircraft toward a safe landing location in sub-process 512.

In the initial part of phase II, the desirable direction of travel is into the wind. This allows reaching the desirable forward airspeed, while minimizing the speed relative to the ground. This requires sensing the direction of the wind, which may be done manually by the pilot using common methods, or automatically based on sensors or other information provided to the aircraft. If the direction of travel is not already into the wind 513, then the pilot or control system makes use of the yaw control mechanism described above to steer the aircraft to the desired direction in sub-process 514.

If at the end of phase I, the average rotor pitch angle had been adjusted to either decrease or increase the forward speed, during the initial part of phase II, as the speed gradually approaches the desired forward speed, the relative front and back rotor pitch is continuously adjusted to gradually restore the average rotor pitch angle to the nominal amount needed to maintain forward speed. The rear rotor pitch is increased slightly to provide a forward change in pitch, while the front rotor pitch is increased slightly to provide a rearward change in pitch.

During phase II, continuous adjustment of the available controls is performed to maintain a balance of forces and torques in sub-process 512. During this phase, careful control of blade pitch and aircraft orientation allows the decrease in gravitational potential energy during descent to maintain the rotation rate of the rotors and the forward speed of the aircraft at appropriate levels needed for a sufficiently slow descent rate to ultimately result in a safe landing. As the aircraft descends, the combination of control of the pitch of the blades of each rotor, and adjustment of the angle of pitch of the average rotor plane using the relative blade pitch of the front and rear rotors, can be used to reach an equilibrium state in which there is no downward acceleration, resulting in a steady rate of descent; no forward acceleration or deceleration, resulting in a steady forward speed; no net rotational torque on the aircraft, resulting in a steady attitude; and no net rotational torque on each rotor, resulting in steady rotation rates.

If the center of mass of the aircraft is not aligned with the geometric center of the set of rotors, then the equilibrium lift among the rotors will differ such that the moment of force relative to the center of gravity from each rotor balance to result in no net torque. In this condition, the steady state collective pitch of each rotor may differ, and the resulting equilibrium rotation rate of each rotor may differ.

As conditions vary during descent, due to wind, changes in air density with elevation, or other factors, the pilot or control system must adjust the set of blade pitch angles, and may need to adjust the attitude, to maintain equilibrium conditions and keep the rotor rotation rate, descent rate, and forward speed within a desired operating range in sub-process 512.

In embodiments in which the rotors include controllable cyclic pitch, after having reduced the cyclic pitch variation to a small amount during phase I, the pilot or control system may include control of cyclic pitch variation among the set of controls continuously adjusted during phase II in balancing the forces and torques.

In embodiments in which additional control mechanisms exist, these additional degrees of freedom may also be used to facilitate reaching a desirable equilibrium state.

During phase II, there may be situations in which the direction of travel must be adjusted to reach a safe landing location. In such cases, the dynamic braking mechanism described above is engaged by the pilot or control system to provide yaw control in sub-process 514.

Once it is determined in process 515 that the aircraft has descended to an elevation sufficiently close to the ground, typically 100 to 150 feet, the controller begins phase III 503, as shown in FIG. 5, which is the flare maneuver, to reduce both vertical and horizontal speed to allow a near zero-speed touchdown. The flare maneuver entails pitching the aircraft back in sub-process 516, using the control mechanisms described in connection with FIG. 4. This maneuver results in increased resistance to forward motion, significantly slowing the forward motion of the aircraft. At the same time, it can increase rotor rotation rate, providing more rotational energy that can be used to slow the final landing phase.

Once it is determined in process 517 that the forward motion has slowed sufficiently, the controller begins phase IV, landing 504, as shown in FIG. 5, in which the controller restores the aircraft pitch to a level orientation in sub-process 518, using the control mechanisms described in connection with FIG. 4, and significantly increases the collective blade pitch of all the rotors to maximize lift needed to slow the rate of descent in sub-process 519, and in doing so, using as much as possible of the remaining rotational energy of the rotors to cushion the final descent and landing in sub-process 520.

In some embodiments, the automatic controller is fully autonomous, being responsible for choosing a safe landing location. In such a case, many means may be used by the controller to do this, which may include combined use of information from a GPS location system, orientation sensors typically provided by an inertial measurement unit (IMU), and a mapping system, either offline or online, which may include information about pre-defined safe location sites. The automatic controller may initiate communication mechanisms to notify a chosen safe landing site of its imminent arrival.

Pitch, Roll and Yaw Control Through Electrical Braking

In other embodiments of the invention, autorotation is initiated through a reduction of collective pitch for each rotor, and thereafter attitude control is achieved through differential adjustment of electrical braking for each electric motor. There may be ongoing use of collective control in these instances, although electrical braking is sufficient to achieve control of pitch, roll, and yaw.

The physics of autorotation dictates that an equilibrium rate of rotor speed occurs when the driving region of the rotor creates sufficient power to balance the consumed power of the driven and stalled regions of the rotor, as illustrated in FIG. 1. Depending upon the choice of rotor blade incidence angle, the equilibrium rate of the rotor in autorotation may be lower or higher than the speed of rotation during normal powered flight. In most embodiments of rotorcraft, the desired rotor speed during autorotation is roughly that of normal operation, because this condition provides the minimal rate of descent without overstressing the rotor mechanism. Presume, for example, that a blade incidence angle is chosen that would otherwise result in an over-speed condition. Applying a certain amount of electrical braking from the corresponding electric motor would bring the rotor speed back to the rate during normal powered flight. If all the rotors have similar characteristics, each corresponding electric motor would use a similar amount of electrical braking.

Consider an embodiment of a rotorcraft configured as described in the immediately preceding paragraph. Once the rotorcraft has entered a state of autorotation, with approximately equal electrical braking applied to each electric motor, the rotorcraft will have a roughly stable attitude. By differentially controlling the electrical braking of the rotors, maintaining approximately constant total braking power from the aggregate of all rotors in autorotation, one can achieve three degrees of attitude adjustment. In an exemplary embodiment, the rotorcraft has four rotors positioned at equal distances from the aircraft center of gravity, though offset by 90 degrees in azimuth from each other. Similar to the powered operation of a quad-copter, differential adjustment of electrical braking power can cause a corresponding adjustment of the aircraft attitude, including yaw, pitch and roll. Of note, comparing with the powered case, the amount of braking power for a rotor represents the reduction in rotor power, as the source of power in autorotation is the reverse airflow through the rotor as the aircraft descends.

One embodiment of a rotorcraft configured for autorotation control through electrical braking is illustrated in FIG. 3. Rotors 202 and 208 turn in a clockwise direction, while rotors 204 and 206 turn in a counter-clockwise direction, as viewed from above. Presume the rotorcraft has entered a state of autorotative descent, whereby collective has been reduced on all rotors, and roughly equal electrical braking is applied to each of the four rotors. Without further adjustment of collective control, the rotorcraft attitude can be controlled over three axes using various combinations of differential electrical braking. These attitude control methods include:

Pitching forward—Increase electrical braking on 204 and 208, while decreasing electrical braking on 202 and 206.

Pitching backward—Increase electrical braking on 202 and 206, while decreasing electrical braking on 204 and 208.

Rolling right—Increase electrical braking on 202 and 204, while decreasing electrical braking on 206 and 208.

Rolling left—Increase electrical braking on 206 and 208, while decreasing electrical braking on 202 and 204.

Yawing clockwise—Increase electrical braking on 202 and 208, while decreasing electrical braking on 204 and 206.

Yawing counter-clockwise—Increase electrical braking on 204 and 206, while decreasing electrical braking on 202 and 208.

We will now consider two distinct architectures for exemplary unmanned rotorcraft control systems, whereby collective control, used to sustain autorotation, is initiated by either electrical or mechanical means.

Figure 6:
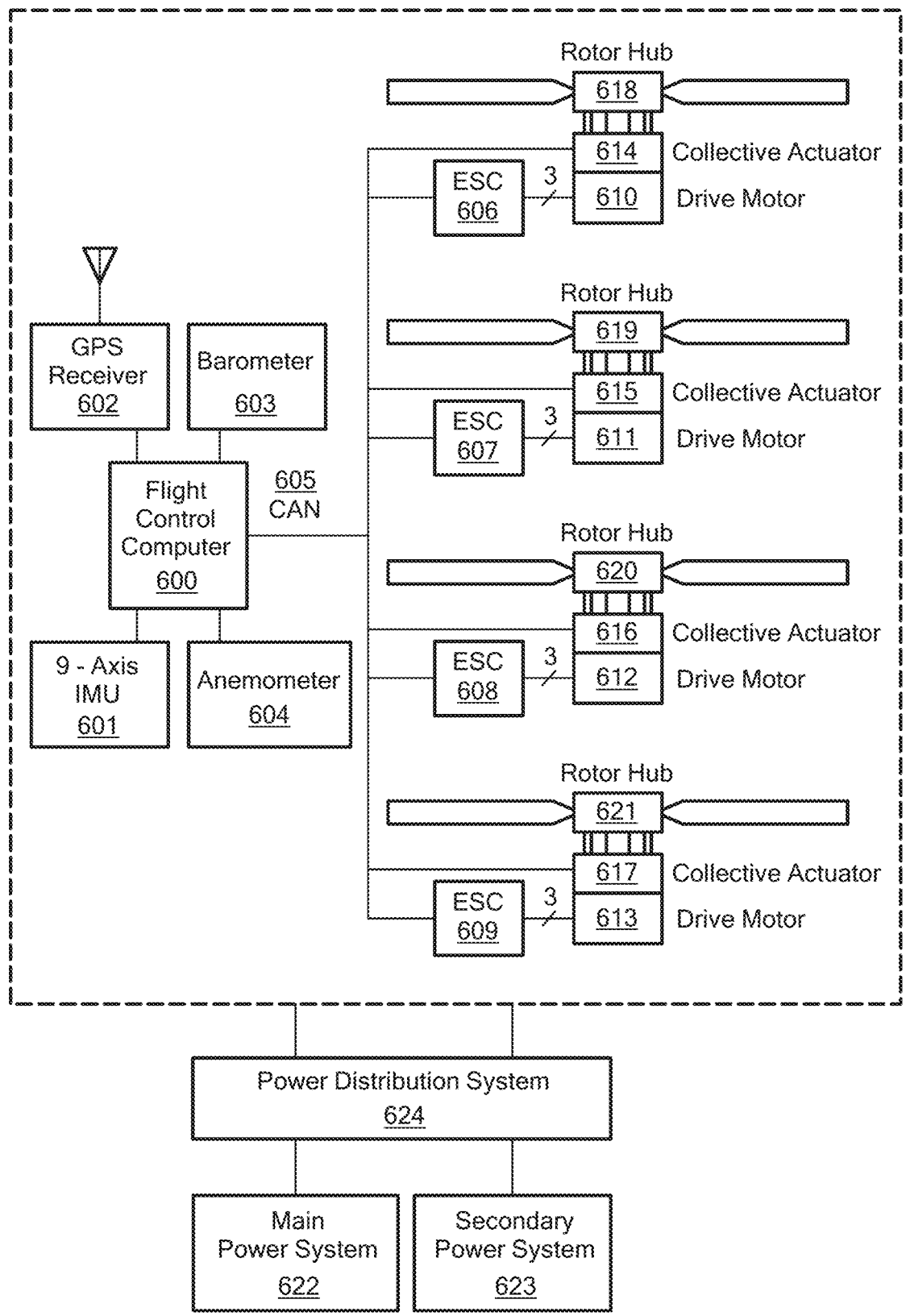
FIG. 6 is a block diagram illustrating an exemplary unmanned rotorcraft control system, in accordance with an embodiment of the present invention, wherein electrically-actuated collective control initiates autorotation, followed by differential electrical braking for attitude control.

FIG. 6 is a block diagram for an unmanned rotorcraft control system, in accordance with an embodiment of the present invention, wherein electrical signals from the Flight Control Computer 600 cause the collective for the set of rotor hubs 618, 619, 620, and 621 to be reduced such that autorotation is sustained for each rotor. In this autonomous unmanned rotorcraft, the Flight Control Computer 600 has the intelligence to ascertain the abnormal conditions precipitating the need for autorotative descent. Various sensor inputs include a 9-axis IMU 601, a Barometer 603, an Anemometer 604, a GPS Receiver 602, and, importantly, voltage, current and temperature sensors within the Main Power System 622, which may indicate a present or impending catastrophic loss of power. When the Flight Control Computer 600 has made the decision to initiate autorotation, it sends messages over the CAN bus 605, to each of the Collective Actuators 614, 615, 616, and 617. These actuators include a microprocessor, motor driver, and gear-reduced electric motors. The motors cause the incidence angle of all rotor blades to adjust in a uniform (collective) manner. The actuators perform the commanded reduction in collective pitch for each rotor hub 618, 619, 620, and 621, and acknowledging the command over the CAN bus 605.

Once autorotation is initiated, the Flight Control Computer 600 in FIG. 6 directs the Electronic Speed Controls (ESCs) 606, 607, 608, and 609 to transition their corresponding Drive Motors 610, 611, 612 and 613 from the power consuming mode as motors, to the power generating mode as generators. The ESCs are set to an initial braking level that is the same across the set of motors. Under normal flight conditions, the ESCs receive power from the Main Power System 622, passing through the Power Distribution System 624. During autorotative flight, wherein the motors become generators, the ESCs pass the energy generated through electrical braking back through the Power Distribution System 624, while now filling the reservoir energy storage associated with the Secondary Power System 623. In one embodiment, the Secondary Power System 623 includes an array of super-capacitors, explicitly designed for the recovery of power during autorotative descent.

After the Flight Control Computer 600 progresses through the first three phases of autorotative descent described in FIG. 5, it then brings the rotorcraft into a level state as described in 518. In one embodiment, all autorotation processes from 507 through 518 occur with electrical braking alone. However, in the completion of Phase IV, namely, Landing 504, bringing the rotorcraft to the landing surface, there are two potential methods, both using increased collective incidence. In the first method, the Flight Control Computer 600 commands each of the Collective Actuators 614, 615, 616, and 617 to gradually increase blade incidence, while the motors remain in a slight braking or neutral state, bringing the rotorcraft to a cushioned landing upon the ground. The landing at minimal velocity is made possible by draining the inertial energy of the rotor systems. Timing is critical for this procedure to work effectively, as the rotorcraft ideally reaches the ground just as the remaining inertial energy approaches zero. In the second method, the Flight Control Computer 600 initiates a power recovery procedure, instructing the ESCs 606, 607, 608, and 609 to return to their normal powered state. This in turn causes the Drive Motors 610, 611, 612, and 613, through the corresponding ESCs, to begin to draw energy from the Secondary Power System 623, where energy has been accumulated throughout the autorotative descent. In the power-recovery state, the rotorcraft will have several seconds to move about, optimize the landing position, and avoid using the critical timing sequence for achieving the "full-down autorotation" described in the first method.

Figure 7:
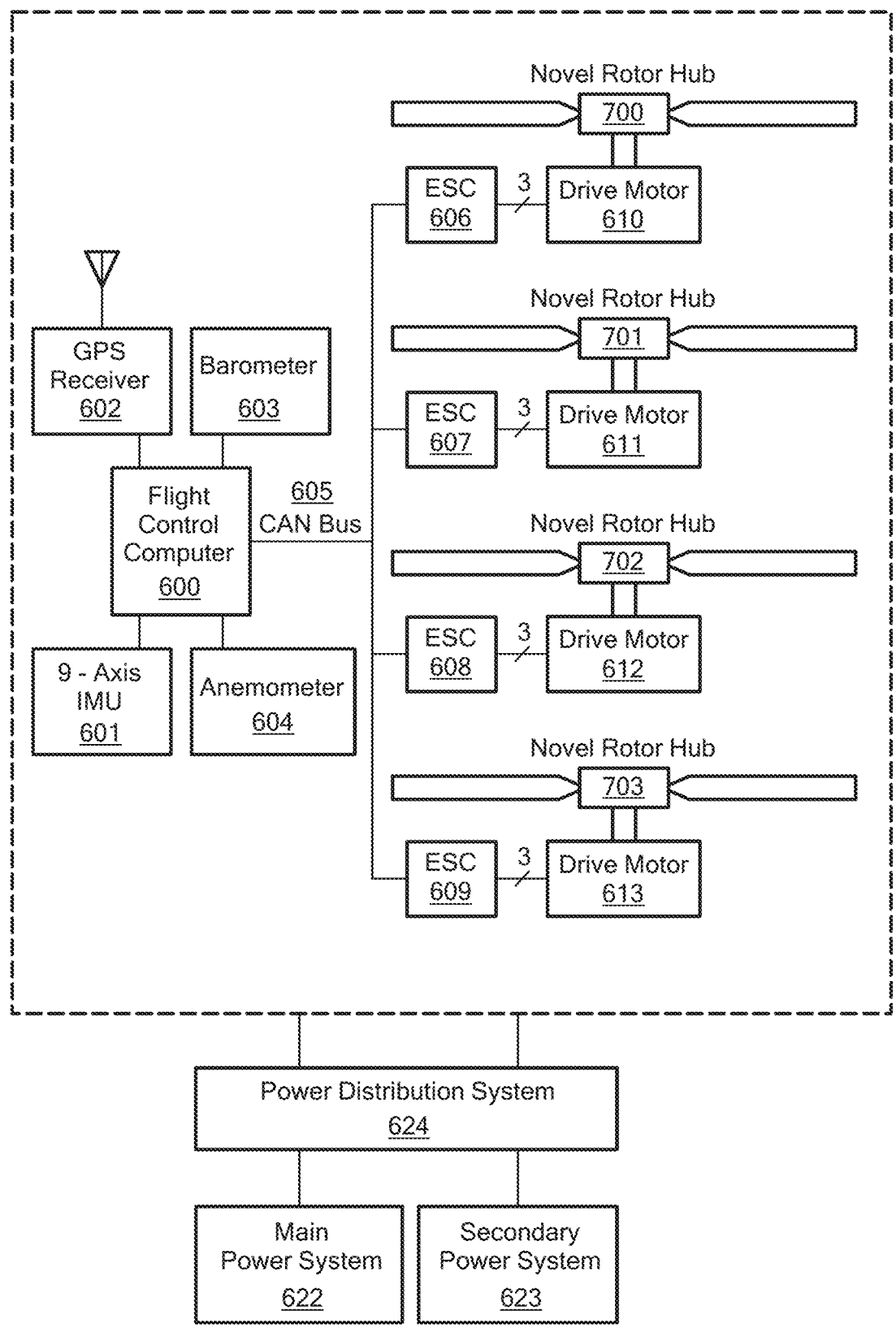
FIG. 7 is a block diagram illustrating an exemplary unmanned rotorcraft control system, in accordance with an embodiment of the present invention, wherein torque-actuated collective control initiates autorotation, followed by differential electrical braking for attitude control.

The second distinct architecture for rotorcraft autorotation control through electrical braking, in accordance with an embodiment of the present invention, is illustrated by the exemplary system diagram in FIG. 7. In this architecture, autorotation of an autonomous unmanned rotorcraft is initiated automatically, through the inclusion of torque-actuated collective control mechanisms for each Novel Rotor Hub 700, 701, 702, and 703. The inventor of the present invention first disclosed this novel rotor mechanism in U.S. Provisional Application No. 63/359,944, "Rotor System for Electrically Powered Rotorcraft," filed Jul. 11, 2022 (herein, "my '944 Provisional"), of which this application above claims the benefit. Whenever the Drive Motors 610, 611, 612, and 613 produce torque which is below a threshold value, whether at the instruction of Flight Control Computer 600, or due to a catastrophic loss of power or failure of one or more subsystems, the corresponding Novel Rotor Hubs 700, 701, 702, and 703 reduce the individual blades incidences such that the rotors can sustain a windmilling state of autorotation. Typical blade incidence during normal powered flight is 10 to 12 degrees, while a blade incidence between 0 and 2 degrees is used to sustain autorotation.

In some embodiments of FIG. 7, the Power Distribution System 624 sustains power to the Flight Control Computer 600, even during a catastrophic loss of power from the Main Power System 622, drawing upon reserve power from the Secondary Power System 623. However, the amount of energy within the Secondary Power System 623 may not allow the Flight Control Computer 600 to return the Drive Motors 610, 611, 612, and 613 to their active state for more than a few seconds. Conserving power during autorotative descent, the Flight Control Computer 600 instructs the ESCs to operate in a braking state, regenerating power from the Drive Motors to the Secondary Power System 623. By maintaining power to the Flight Control Computer 600 through the transition to autorotative descent, the Flight Control Computer 600 can apply differential braking to execute the process steps 507 through 518, thereby adjusting an orientation of the rotorcraft. In the final two process steps of Phase IV, Landing 504, the embodiment of FIG. 7 uses a power recovery of the Drive Motors 610, 611, 612, and 613, because the collective blade incidence is controlled only through the application of driving motor torque. Thus, unlike the prior embodiment described by FIG. 6, wherein the rotorcraft has the capability to complete the autorotation sequence with or without drive power, the embodiment of FIG. 7 executes process 519 using power. Otherwise, should an embodiment of FIG. 7 have insufficient stored energy to execute a power recovery, skipping process 519, the rotorcraft will experience a hard landing in the final step, Land 520.

Compared to the configuration of FIG. 6, the architecture of FIG. 7, uses power recovery to gracefully reach the Land 520, would suggest that the architecture of FIG. 7 is inferior to the architecture of FIG. 6. To the contrary, in FIG. 7, the Novel Rotor Hubs 700, 701, 702, and 703 ensure that the rate of descent is dramatically reduced through the automatic initiation of autorotation, even if there is a complete failure of all electrical systems. In contrast, an embodiment according to FIG. 6 uses that electrical power and control be available to cause Collective Actuators 614, 615, 616, and 617 to reduce rotor blade incidence angles. Without the rapid reduction of rotor blade incidence, upon a loss of rotor power, the angular velocities of Rotor Hubs 618, 619, 620, and 621 quickly degrade, resulting in a catastrophic rate of descent to the terrain. On the other hand, in the worst-case electrical failure of an embodiment according to FIG. 7, presuming the mechanical systems remain viable, the rotorcraft rate of descent is dictated by the physics of uncontrolled autorotation. As an approximation of the outcome, the rotorcraft will descend to the terrain at a rate comparable to having a parachute recovery system with an area equal to the total swept rotor area. While certainly not a graceful or controlled landing, the outcome will likely avoid the complete destruction of the aircraft or a loss of life. Hence, the Novel Rotor Hub included in embodiments according to FIG. 7 provides a unique benefit, particularly for electrically-powered rotorcraft.

Figure 8A:
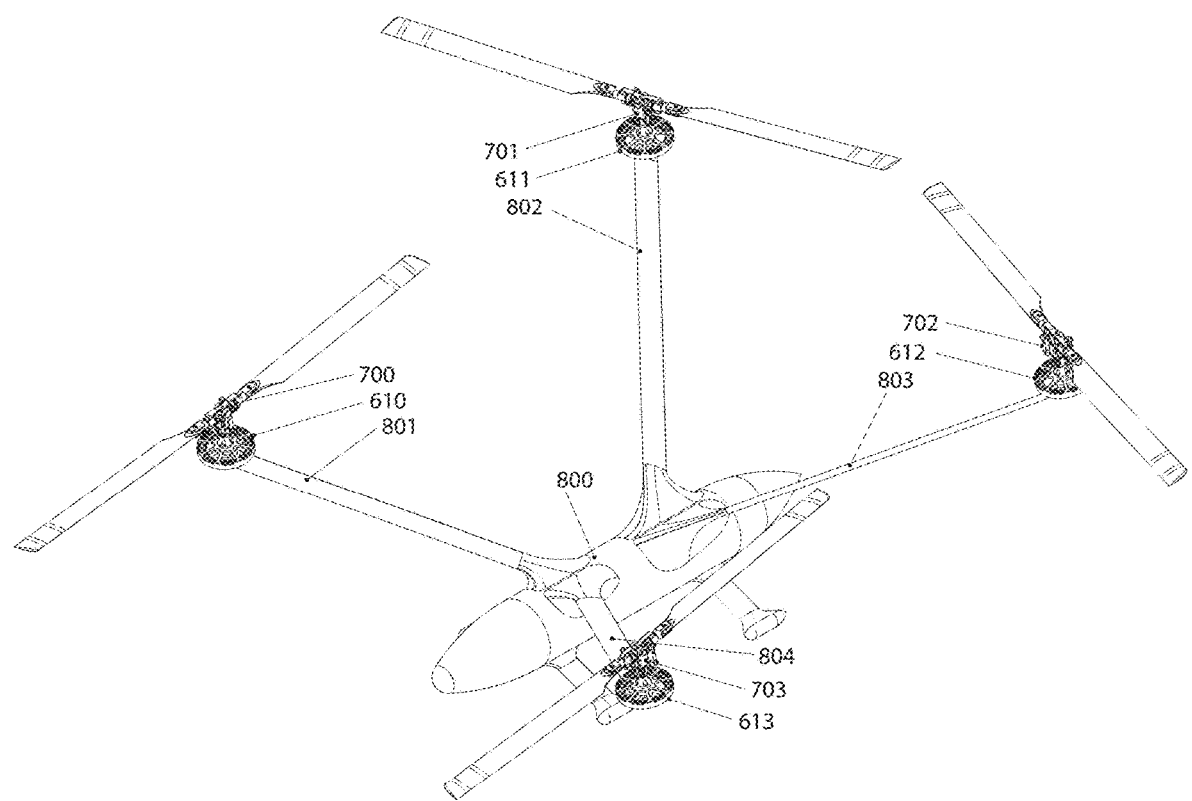
FIG. 8A is a perspective view of an unmanned rotorcraft optimized for forward flight, in accordance with an embodiment of the present invention, which includes torque-actuated collective control for each rotor, and the means for differential electrical braking during autorotative descent.
Figure 8B:
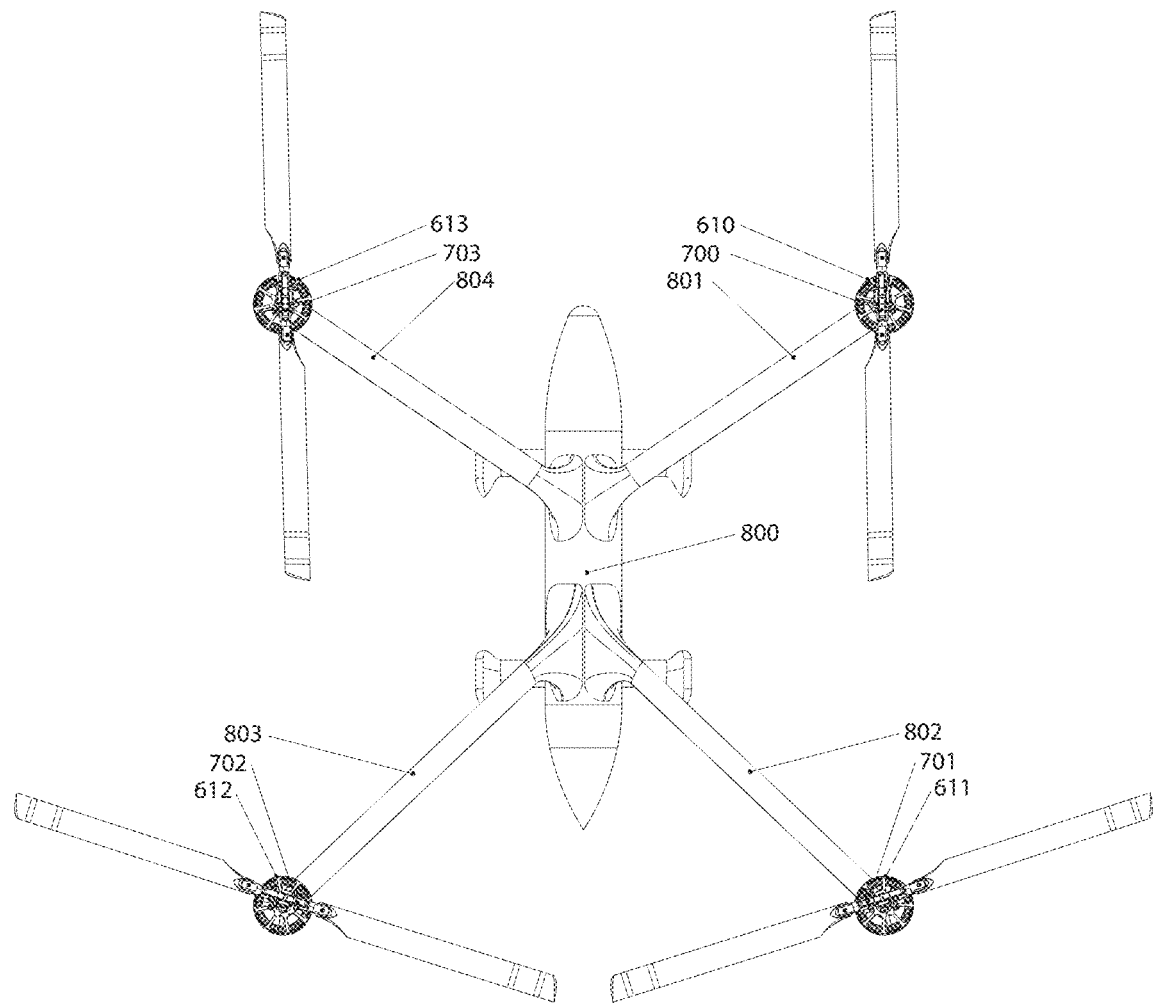
FIG. 8B is a top view of the rotorcraft of FIG. 8A
Figure 8C:
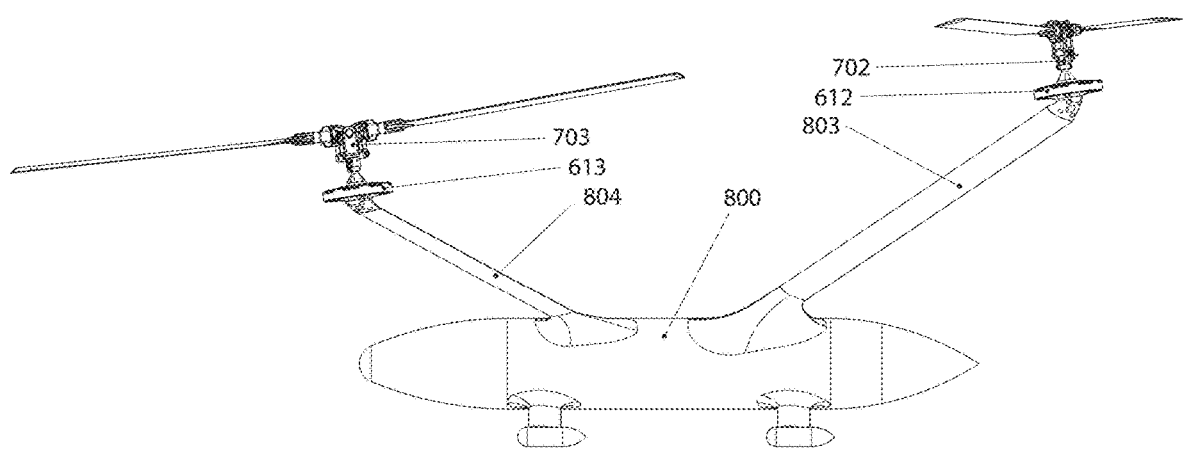
FIG. 8C is a side view of the rotorcraft of FIG. 8A
Figure 8D:
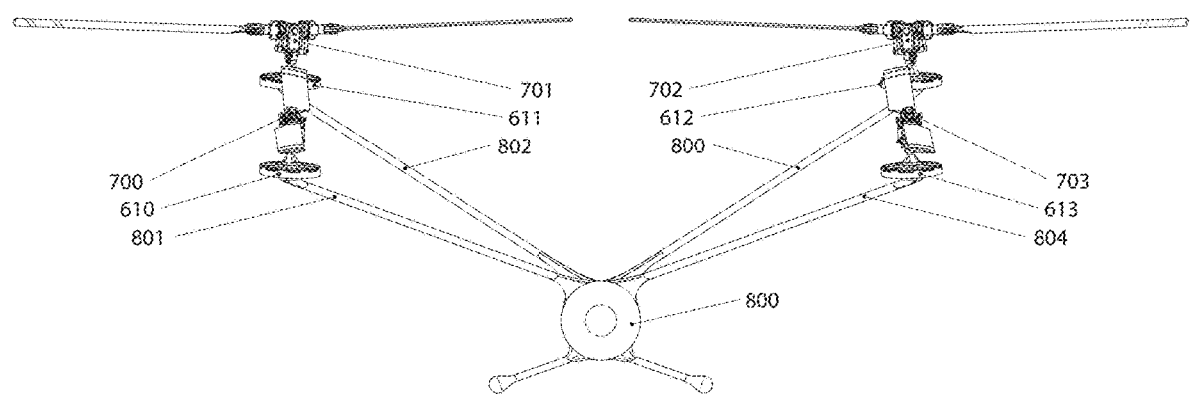
FIG. 8D is a front view of the rotorcraft of FIG. 8A

FIGS. 8A through 8D illustrate an unmanned rotorcraft designed according to the methods described in U.S. Pat. No. 11,597,505, "Rotorcraft Optimized for Forward Flight," this patent being incorporated herein by reference, in accordance with a further embodiment of the present invention. FIG. 8A is a perspective view, FIG. 8B is a top view, FIG. 8C is a side view, and FIG. 8D is front view. In the exemplary embodiment, lithium-ion batteries represent 60% of the overall aircraft mass. The batteries are advantageously packaged as a long rectangular subassembly within the streamlined fuselage 800. One of the key innovations of this embodiment is the use of supporting struts 801, 802, 803, and 804, which serve dual purposes as (a) mounts for the rotor systems, and (b) airfoils for augmented lift. To provide high lifting efficiency and a docile rate of autorotative descent, the unmanned rotorcraft has a disk loading of 0.8 lbs/ft^2 (3.9 kg/m^2). The aerodynamic design optimizations illustrated, combined with a high battery weight fraction, allow the exemplary unmanned rotorcraft to fly over greater distances than typical UAVs lacking these accommodations. The exemplary rotorcraft incorporates a control system as described in FIG. 7, including the integration of torque-actuated Novel Rotor Hubs 701, 702, 703, and 704. The Drive Motors 610, 611, 612, and 613 are brushless DC "outrunner" motors. These motors have a high pole count and a large diameter, allowing them to operate efficiently at lower speeds than typical BLDC motors. With the exception of the Drive Motors, the balance of the electronic components in FIG. 7 is mounted within the fuselage 800.

Figure 9:
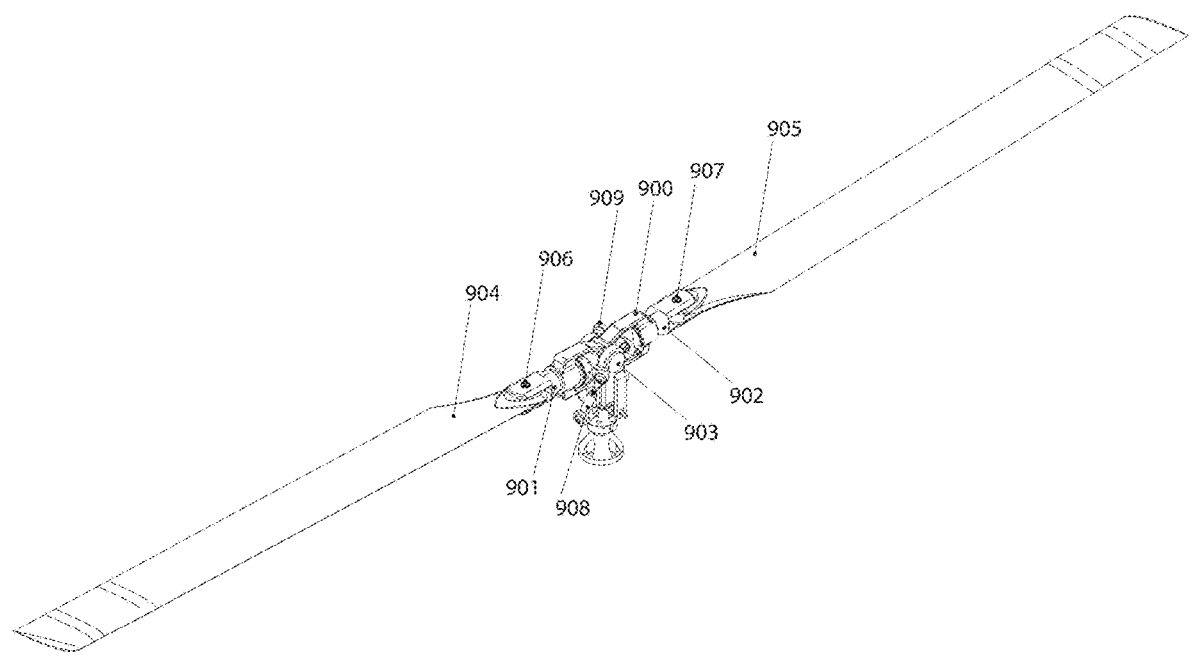
FIG. 9 is an exemplary novel rotor hub, in accordance with an embodiment of the present invention, including a torque-actuated mechanism configured to cause a reduction of blade incidence upon a loss of power from the corresponding electric motor.

FIG. 9 is close-up perspective view of one of the four Novel Rotor Hubs 701, 702, 703, and 704, first disclosed in my '944 Provisional. The Teetering Blade Mount 900 accommodates the attachment of Blade Mount Stems 901 and 902, allowing rotation along the feathering axis for each Rotor Blade 904 and 905. In the center of the Teetering Blade Mount 900 is the Teetering Hinge 903, which allows free movement about the flapping axis. The Rotor Blades 904 and 905 are attached to the Blade Mount Stems 901 and 902 with Blade Attachment Bolts 906 and 907. These bolts define lead/lag axes for the Rotor Blades 904 and 905 respectively about which the blades are permitted to experience angular displacement in relation to the hub. Ball Linkages 908 and 909 cause the articulation of the Blade Mount Stems 901 and 902, respectively, about their central axes, in turn causing a change in incidence angle respectively for each Rotor Blade 904 and 905. Such a change in blade incidence occurs due to a combination of the teetering (flapping) angle and the state of the torque activated mechanism at the base of the rotor assembly. The coupling of the flapping angle into the feathering angle of the blades is known as "Delta-3." The blade that flaps upward experiences a reduction in blade incidence, while the blade that flaps downward experiences an increase in blade incidence. In the illustrated embodiment of FIG. 9, the Delta-3 coupling angle is chosen as 45-degrees. Regardless, whether the Novel Rotor Hub is in the active or autorotative state, the Delta-3 coupling moderates the lift dissymmetry inherent for an edgewise rotor in forward flight.

Figure 10:
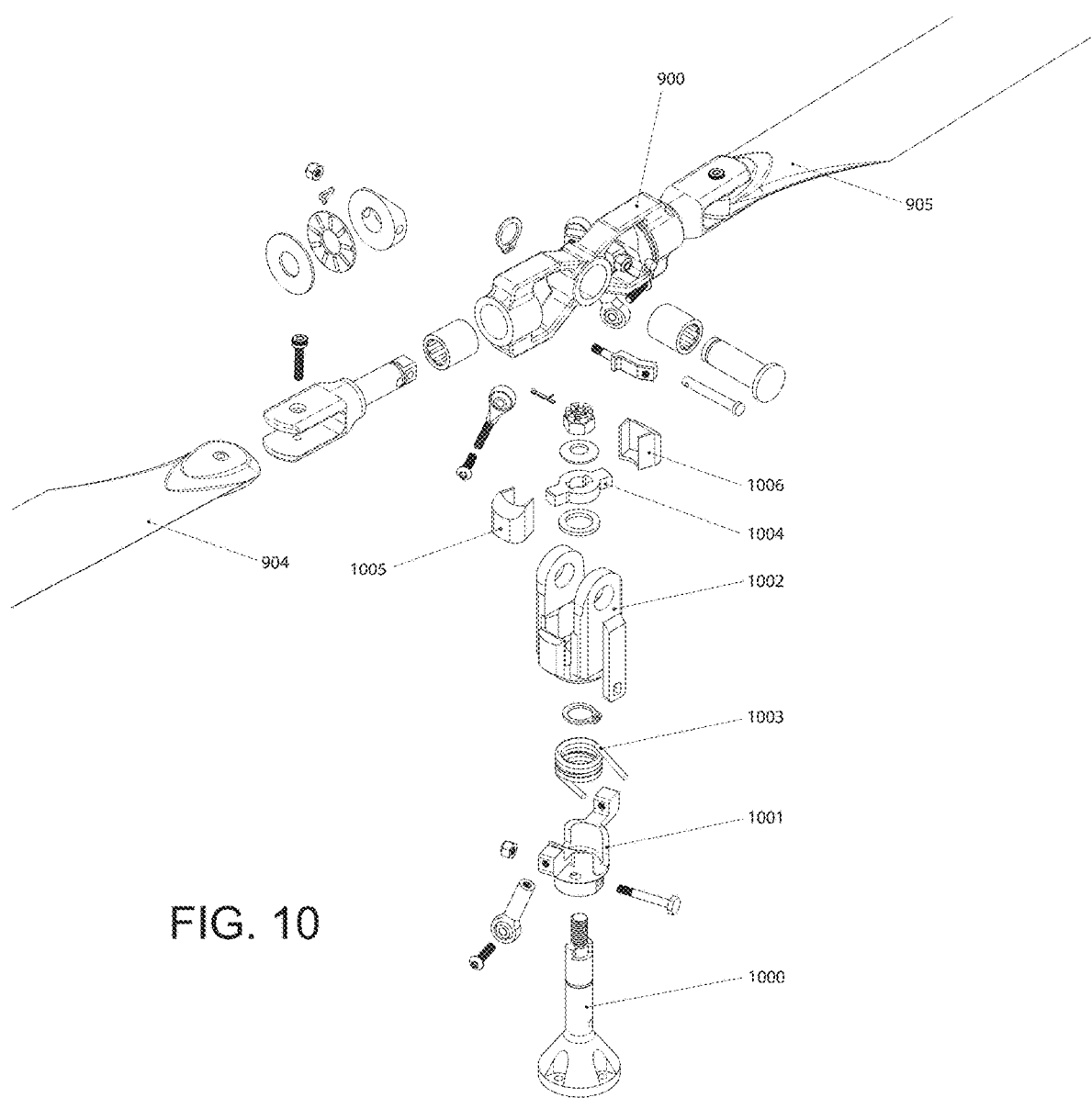
FIG. 10 is an exploded view of the novel rotor hub of FIG. 9.

FIG. 10 is an exploded view of the Novel Rotor Hub of FIG. 9, revealing details of the torque-actuated mechanism that facilitate autorotative descent. Rotor Mount 1000 attaches to an output of a Drive Motor. The Base Actuator 1001 remains rigidly attached to the Rotor Mount 1000, while the Rotor Hub 1002 has a limited degree of angular movement relative to the Base Actuator 1001. In the resting state, the force of Spring 1003 causes Rotor Hub 1002 to rotate counter-clockwise with respect to the Base Actuator 1001. The Pivot Plate 1004, which is attached to the Rotor Mount 1000, is confined within the angles defined by the Hard Stops 1005 and 1006. In the resting state, the nominal Rotor Blade incidence angle is 0 degrees, though differentially moderated through the Delta-3 coupling. When the Drive Motor is powered, applying torque above a threshold value through the Rotor Mount 1000, the Spring 1003 force is overcome, and the Rotor Hub 1002 rotates clockwise with respect to the Base Actuator 1001. Again, the Pivot Plate 1004 is confined within the Hard Stops 1005 and 1006. With the limited degree of rotation allowed by design, Ball Linkages 908 and 908 pull downward, causing the Blade Stem Mounts 901 and 902 to increase the Rotor Blade 904 and 905 nominal incidence angles from 0 degrees to 10 degrees. In other embodiments, various other mechanical means of entering the autorotative state can be used instead of spring 1003.

In the active rotor state, Drive Motor power causes the downward flow of air, creating sufficient lift for powered flight. Whenever Drive Motor torque drops below a threshold value, such as when the Main Power System 622 fails, the force of Spring 1003 returns the Rotor Blade 904 and 905 nominal incidence angles to the resting condition of 0 degrees, allowing an upward flow of air to sustain the rotor in a windmilling state of autorotation. Electrical braking of a Drive Motor results in a negative torque, as compared with the torque provided by the Drive Motor in powered flight. Consequently, electrical braking, as described for the embodiment of FIG. 7, results in a force applied against the hard stops at the 0-degree blade incidence. The rotation of Rotor Hub 1002 can go no farther with respect to the Base Actuator 1001. Hence, the nominal incidence angles of Rotor Blades 904 and 905 remains at 0 degrees, regardless of the extent of electrical braking applied to the Drive Motors 610, 611, 612, and 613.

The embodiments of the invention described above are intended to be merely exemplary; numerous variations and modifications will be apparent to those skilled in the art. All such variations and modifications are intended to be within the scope of the present invention as defined in any appended claims.

What is claimed is:

1. A method of operating an electrically powered rotorcraft having a fuselage and a set of N rotors, N≥4, wherein each rotor has a rotor hub and a set of blades, each blade having an angle of incidence, the set of rotors driven by a set of electric motors and coupled to the fuselage, the rotorcraft having a system controller configured to control operation of the set of N rotors, the method comprising:

biasing each blade with a spring force to cause such blade to have an angle of incidence of approximately zero degrees when rotor torque on the rotor hub of such blade is absent, wherein the spring force is overcome when rotor torque on such rotor hub exceeds a threshold;

under a condition wherein a failure prevents supplying, to each rotor hub, rotor torque exceeding the threshold, operating the rotorcraft in a failsafe mode wherein (i) the spring force associated with each rotor hub such shall have caused blades thereof to have an angle of incidence of approximately zero degrees and (ii) autorotation is enabled in at least four of the rotors; and (iii) differential control of electrical braking of the set of rotors is enabled by the system controller to affect attitude of the rotorcraft.

2. A method according to claim 1, wherein each rotor hub is further configured to cause the angle of incidence of each corresponding blade to be positive, when the rotor torque exceeds a threshold.

3. A method according to claim 1, wherein the rotor hub includes a set of linkages that articulate a set of blade mount stems to support adjustment of the angle of incidence of each corresponding blade.

4. A method according to claim 1, wherein causing control of electrical braking includes connecting a resistive load to each of the electric motors associated with the selected group of the rotors.

5. A method according to claim 1, wherein causing control of electrical braking includes configuring each of the electric motors associated with the selected group of the rotors in relation to a set of batteries to provide regenerative braking.

6. A method according to claim 1, wherein:

the electrically powered rotorcraft has a primary battery system and a secondary battery system, the battery systems having a configuration, during ordinary operation, in which at least the primary battery system powers the rotorcraft; and entering into the failsafe mode of operation further includes mechanically switching the secondary battery system to provide power, for control of the rotorcraft to the exclusion of the primary battery system.

7. A method according to claim 6, wherein the electrically powered rotorcraft has independent primary and secondary control circuits and the secondary battery system is coupled exclusively to the secondary control circuit at least when the rotorcraft is in the failsafe mode of operation.

8. A method according to claim 2, further comprising causing, by the system controller, control of the collective pitch of the blades of the rotors to maintain targeted rates of descent and forward motion.

9. A method according to claim 2, further comprising causing, by the system controller, control of cyclic pitch variation of the blades of the rotors to maintain a rate of descent and forward motion.

10. A method according to claim 2, wherein each of the rotors includes a set of blades,
and each blade has a coupled electric actuator configured to control pitch of such blade,
and causing control of electrical braking includes controlling the electric actuator of each blade.

11. A method according to claim 1, further comprising operatively connecting each of the electric motors to a corresponding rotor through a planetary gear system configured to avoid substantially impeding rotation of the corresponding rotor during power loss to such motor.

12. A method according to claim 1, wherein causing differential control of electrical braking further includes providing disk loading of the set of rotors such that an autorotative descent rate of the rotorcraft is less than 10 meters per second.

13. An electrically powered rotorcraft comprising:
four rotors driven by a set of electric motors, each rotor comprising a rotor hub and a set of blades;
a system controller configured to control operation of the four rotors and the set electric motors;
each rotor comprising a spring, the spring providing a spring force and being coupled to the rotor hub and the set of blades;
wherein the spring force biases each set of blades to have an angle of incidence of approximately zero degrees when rotor torque is absent, wherein the spring force is overcome when the rotor torque exceeds a threshold;
wherein, in the presence of rotor torque below the threshold, autorotation of the four rotors is enabled and the system controller is configured to cause differential electrical braking of the four rotors to adjust an orientation of the rotorcraft.

14. An electrically powered rotorcraft according to claim 13, further comprising a mechanism within each rotor to reduce incidence angle of its rotor blades when the corresponding electric motor torque is reduced.

15. An electrically powered rotorcraft according to claim 13, wherein causing differential electrical braking includes connecting a resistive load to each of the electric motors associated with the selected group of the rotors.

16. An electrically powered rotorcraft according to claim 13, further comprising a set of batteries, associated with at least one rotor, configured such that the set of batteries is recharged during electrical braking of the at least one rotor.

17. An electrically powered rotorcraft according to claim 13, further comprising:
a primary battery system and a secondary battery system, the battery systems having a configuration, during ordinary operation, in which at least the primary battery system powers the rotorcraft; and
operating in the failsafe mode of operation includes configuring the secondary battery system to provide power for control of the rotorcraft, to the exclusion of the primary battery system.

18. An electrically powered rotorcraft according to claim 17, wherein the rotorcraft has independent primary and secondary control circuits and the secondary battery system is coupled exclusively to the secondary control circuit at least when the rotorcraft is operating in the failsafe.

19. An electrically powered rotorcraft according to claim 13, wherein operating the rotorcraft in the failsafe mode further comprises:
controlling the collective pitch of the blades of the rotors to maintain targeted rates of descent and forward motion.

20. An electrically powered rotorcraft according to claim 13, wherein operating the rotorcraft in the failsafe mode further comprises:
controlling cyclic pitch variation of blades of the rotors to maintain targeted rates of descent and forward motion.

21. An electrically powered rotorcraft according to claim 13, wherein each of the rotors includes a set of blades, and each blade includes an electric actuator configured to control pitch of such blade.

22. An electrically powered rotorcraft according to claim 13, wherein each motor of the set of electric motors is coupled to a corresponding rotor through a planetary gear system design configured to avoid substantially impeding rotation of the corresponding rotor during power loss to such motor.

23. An electrically powered rotorcraft according to claim 13, wherein operating the rotorcraft in the failsafe mode further comprises providing disk loading of the set of rotors such that an autorotative descent rate of the rotorcraft is less than 10 meters per second.

24. A method of operating an electrically powered rotorcraft having a fuselage and a set of N rotors driven by a set of electric motors and coupled to the fuselage, $N \geq 4$, as well as a system controller configured to control operation of the set of N rotors, the method operating under a failure condition preventing ordinary operation of the rotorcraft and comprising, under the failure condition:
entering, by the system controller, into a failsafe mode of operation wherein autorotation of at least four of the rotors is enabled; and
causing, by the system controller, control of electrical braking of each rotor in the set relative to electrical braking of each other rotor in the set, to affect pitch, roll and yaw of the aircraft
wherein each rotor has a rotor hub and a set of blades, wherein each rotor hub is configured to provide a spring force to bias the angle of incidence of each corresponding blade toward approximately zero degrees in the absence of rotor torque.

25. A method according to claim 24, further comprising causing, by the system controller, control of the collective pitch of the blades of the rotors to maintain a rate of descent and forward motion.

26. A method according to claim 24, further comprising causing, by the system controller, control of cyclic pitch variation of the blades of the rotors to maintain a rate of descent and forward motion.

27. A method according to claim 24, wherein each of the rotors includes a set of blades, and each blade has a coupled electric actuator configured to control pitch of such blade, wherein causing control of electrical braking includes controlling the electric actuator of each blade.

* * * * *